United States Patent
Kinoshita et al.

(10) Patent No.: US 8,380,818 B2
(45) Date of Patent: Feb. 19, 2013

(54) INFORMATION PROCESSING SYSTEM, INFORMATION PROCESSING DEVICE, INFORMATION PROCESSING METHOD, AND PROGRAM

(75) Inventors: Akihiko Kinoshita, Tokyo (JP); Hiroyuki Chiba, Kanagawa (JP); Takashi Kanao, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 12/128,989

(22) Filed: May 29, 2008

(65) Prior Publication Data
US 2008/0301262 A1    Dec. 4, 2008

(30) Foreign Application Priority Data
May 31, 2007    (JP) ................................. 2007-144551

(51) Int. Cl.
*G06F 15/16*    (2006.01)
(52) U.S. Cl. ......... 709/219; 709/220; 725/111; 370/229
(58) Field of Classification Search .................. 709/219, 709/220; 705/1; 370/229
See application file for complete search history.

(56) References Cited

U.S. PATENT DOCUMENTS

| | | | | |
|---|---|---|---|---|
| 2003/0174646 A1* | 9/2003 | Gruhl et al. | | 370/229 |
| 2007/0244999 A1* | 10/2007 | Hamanaka et al. | | 709/220 |
| 2008/0046262 A1* | 2/2008 | Hug | | 705/1 |
| 2008/0235746 A1* | 9/2008 | Peters et al. | | 725/111 |

FOREIGN PATENT DOCUMENTS

| | | |
|---|---|---|
| JP | 2003-177996 | 6/2003 |
| JP | 2003-304290 | 10/2003 |
| JP | 2006-31337 | 2/2006 |
| JP | 2006-54818 | 2/2006 |
| JP | 2007-96554 | 4/2007 |

* cited by examiner

*Primary Examiner* — Kyung H Shin
(74) *Attorney, Agent, or Firm* — Frommer Lawrence & Haug LLP; William S. Frommer

(57) ABSTRACT

An information processing system that includes first and second information processing devices for performing communication through a network, which include a first transmission unit for, in the case of data to be downloaded being selected, transmitting a data download request to the second information processing device along with downloaded data identification information, and third information processing device identification information. A second transmission unit transmits a data download request to the third information processing device identified with the data identification information and the device identification information in response to the download request from the first information processing device, respectively. A third information processing device downloads data through the network from a distribution server.

5 Claims, 17 Drawing Sheets

FIG. 5

| CONTENT ID | CONTENT TITLE | DOWNLOADABLE DATE | DOWNLOAD URL |
|---|---|---|---|
| 1900-001 | k-100 GRAND PRIX 1900 | 3/10/2007 | www.k-1.com/19·· |
| 1901-001 | k-100 GRAND PRIX 1901 | 3/10/2007 | www.k-1.com/19·· |
| 1902-001 | k-100 GRAND PRIX 1902 | 5/1/2008 | www.k-1.com/19·· |
| 1903-001 | k-100 GRAND PRIX 1903 | 5/1/2008 | www.k-1.com/19·· |

CONTENTS GUIDE

FIG. 15

CASE OF CONTENT ID NOT BEING INCLUDED IN CONTENT GUIDE

| CONTENT TITLE | DOWNLOAD CONTROL INFORMATION ACQUISITION URL |
|---|---|
| k-100 GRAND PRIX 1900 | www.aaa.com/19·· |
| k-100 GRAND PRIX 1901 | www.aaa.com/19·· |
| k-100 GRAND PRIX 1902 | www.aaa.com/19·· |
| k-100 GRAND PRIX 1903 | www.aaa.com/19·· |

FIG. 16

EXAMPLE OF "DOWNLOAD CONDITIONS"
MAY DIFFER FROM ONE CONTENT RECEPTION DEVICE TO ANOTHER

| CONTENT ID | DOWNLOADABLE DATE | DOWNLOAD URL |
|---|---|---|
| 1900-001 | 3/10/2007 | www.k-1.com/19·· |
| 1901-001 | 3/10/2007 | www.k-1.com/19·· |
| 1902-001 | 5/1/2008 | www.k-1.com/19·· |
| 1903-001 | 5/1/2008 | www.k-1.com/19·· |

DATE FROM WHICH DOWNLOAD IS AVAILABLE. CONTENT RECEPTION DEVICE SIDE GIVES DOWNLOAD INSTRUCTIONS BASED ON THIS DATE. DOWNLOAD IS IMMEDIATELY AVAILABLE FOR DATES ALREADY PASSED, BUT FOR FUTURE DATES, DOWNLOAD IS STARTED FROM THAT DATE

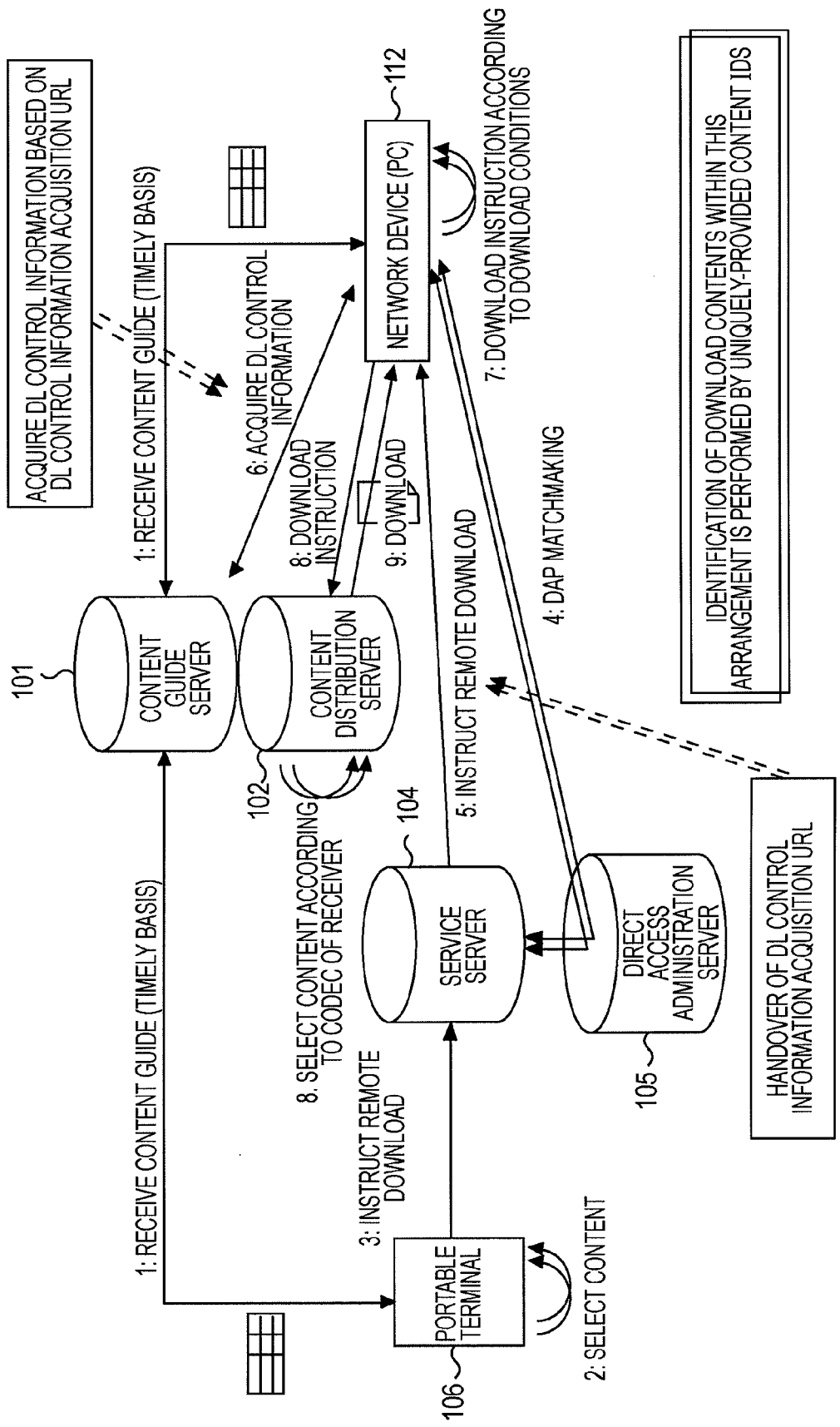

INFORMATION PROCESSING SYSTEM, INFORMATION PROCESSING DEVICE, INFORMATION PROCESSING METHOD, AND PROGRAM

CROSS REFERENCES TO RELATED APPLICATIONS

The present invention contains subject matter related to Japanese Patent Application JP 2007-144551 filed in the Japanese Patent Office on May 31, 2007, the entire contents of which are incorporated herein by reference.

BACKGROUND OF THE INVENTION

1. Field of the Invention

The present invention relates to an information processing system, information processing device, information processing method, and program, and particularly, relates to an information processing system, information processing device, information processing method, and program, whereby downloading of data can be performed even if there is no neighborhood network device for downloading data from a distribution server for distributing data through a network.

2. Description of the Related Art

Examples of network devices for downloading data of contents such as images (including moving images and still images (photographs and etc.)), audio (music), software (programs), and so forth include PCs (Personal Computers) capable of communication through a network, cellular phones, and further content receivers such as STBs (Set Top Box) or the like. According to a network device such as a PC, cellular phone, or the like, a user can download a desired content to the network device thereof by operating the network device thereof.

Note that a technique has previously been proposed wherein with a cellular phone of a user who is away from home, EPG data or the like is received and displayed at the user's own VCR at home (e.g., see Japanese Unexamined Patent Application Publication No. 2006-54818).

SUMMARY OF THE INVENTION

Incidentally, for example, when a user is at home, the user operates a PC installed at home, whereby a desired content can be downloaded to the PC thereof. Also, for example, even when a user possessing a cellular phone is away from home, a desired content can be downloaded to the cellular phone by operating the cellular phone thereof. Note however, the user cannot operate a network device which is not at that location, so it has been difficult to download a desired content to a network device which is not at that location. Specifically, for example, when a user possessing a cellular phone is away from home, a content can be downloaded to the cellular phone thereof, but downloading a content to a PC at home can be performed only after the user goes home.

It has been recognized that there is a need to enable data to be downloaded to a network device for downloading data from a distribution server for distributing data through a network even if this network device is not at that location.

According to an embodiment of the present invention, an information processing system includes: first and second information processing devices configured to perform communication through a network; and a third information processing device for downloading data through the network from a distribution server configured to distribute data; with the first information processing device including a first transmission unit configured to, in the case of data to be downloaded being selected, transmit a download request for requesting downloading of data to the second information processing device through the network along with data identification information for identifying the data to be downloaded, and device identification information for identifying the third information processing device for performing downloading of data; with the second information processing device including a second transmission unit configured to transmit a download request for requesting downloading of data to the third information processing device identified with the data identification information and the device identification information in response to the download request from the first information processing device; with the third information processing device including a download unit configured to download data identified with the data identification information from the distribution server through the network in response to the download request from the second information processing device.

With the above configuration, in the case of data to be downloaded being selected, the first information processing device transmits a download request for requesting downloading of data to the second information processing device through the network along with data identification information for identifying the data to be downloaded, and device identification information for identifying the third information processing device for performing downloading of data. In response to the download request from the first information processing device, the second information processing device transmits a download request for requesting downloading of data to the third information processing device identified with the data identification information and the device identification information, and in response to the download request from the second information processing device, the third information processing device downloads the data identified with the data identification information from the distribution server through the network.

According to an embodiment of the present invention, an information processing device for performing communication through a network, or a program causing a computer to function as an information processing device, includes: a transmission unit configured to, in the case of data to be downloaded being selected, transmit a download request for requesting downloading of data through the network to a service server configured to provide a service for controlling downloading of data along with data identification information for identifying the data to be downloaded, and device identification information for identifying a network device for performing downloading of data.

According to an embodiment of the present invention, an information processing method for an information processing device configured to perform communication through a network, includes a step of: transmitting, in the case of data to be downloaded being selected, a download request for requesting downloading of data through the network to a service server configured to provide a service for controlling downloading of data along with data identification information for identifying the data to be downloaded, and device identification information for identifying a network device for performing downloading of data.

With the above configuration, in the case of data to be downloaded being selected, a download request for requesting downloading of data is transmitted through the network to a service server configured to provide a service for controlling downloading of data along with data identification information for identifying the data to be downloaded, and device identification information for identifying a network device for performing downloading of data.

According to an embodiment of the present invention, an information processing device for performing communication through a network, or a program causing a computer to function as an information processing device, including: a transmission unit configured to transmit, in response to the download request from a terminal configured to transmit a download request for requesting downloading of data along with data identification information for identifying the data to be downloaded and device identification information for identifying a network device for performing downloading of data in the case of data to be downloaded being selected, a download request for requesting downloading of data to the network device identified with the device identification information along with the data identification information through the network.

According to an embodiment of the present invention, an information processing method for an information processing device configured to perform communication through a network includes a step of: transmitting, in response to the download request from a terminal configured to transmit a download request for requesting downloading of data along with data identification information for identifying the data to be downloaded and device identification information for identifying a network device for performing downloading of data in the case of data to be downloaded being selected, a download request for requesting downloading of data to the network device identified with the device identification information along with the data identification information through the network.

With the above configuration, a download request for requesting downloading of data is transmitted to the network device identified with the device identification information along with the data identification information through the network, in response to the download request from a terminal configured to transmit a download request for requesting downloading of data along with data identification information for identifying the data to be downloaded and device identification information for identifying a network device for performing downloading of data in the case of data to be downloaded being selected.

According to an embodiment of the present invention, an information processing device downloads data from a distribution server for distributing data, with a program causing a computer to function as an information processing device, the information processing device including: a download unit configured to download, in response to the download request from a service server configured to provide a service for controlling downloading of data by transmitting a download request for requesting downloading of data along with data identification information for identifying the data to be downloaded through the network, the data identified with the data identification information from the distribution server through the network.

According to an embodiment of the present invention, an information processing method for an information processing device configured to download data through a network from a distribution sever for distributing data includes a step of: downloading, in response to the download request from a service server configured to provide a service for controlling downloading of data by transmitting a download request for requesting downloading of data along with data identification information for identifying the data to be downloaded through the network, the data identified with the data identification information from the distribution server through the network.

With the above configuration, a download request for requesting downloading of data is transmitted along with data identification information for identifying the data to be downloaded through the network, whereby in response to the download request from a service server configured to provide a service for controlling downloading of data, the data identified with the data identification information is downloaded from the distribution server through the network.

Note that the program can be provided by being transmitted via a transmission medium, or by being recorded in a non-transitory computer-readable recording medium.

Also, the above-mentioned network is not restricted to a network wherein only wireless communication or cable communication is performed, but also may be a network wherein communication in which wireless communication and cable communication coexist, i.e., wireless communication is performed within a certain section, and cable communication is performed within another section.

According to the above-described configurations, data can be downloaded from a distribution server for distributing data through a network. Particularly, even if a (network) device for downloading data is not at that location, data can be downloaded to the device thereof.

BRIEF DESCRIPTION OF THE DRAWINGS

FIG. 5 is a diagram illustrating a content guide;

FIG. 15 is a diagram illustrating another example of the content guide;

FIG. 16 is a diagram illustrating another example of the download control information; and FIG. 17 is a diagram for describing another remote download processing.

DESCRIPTION OF THE PREFERRED EMBODIMENTS

Figure 1:
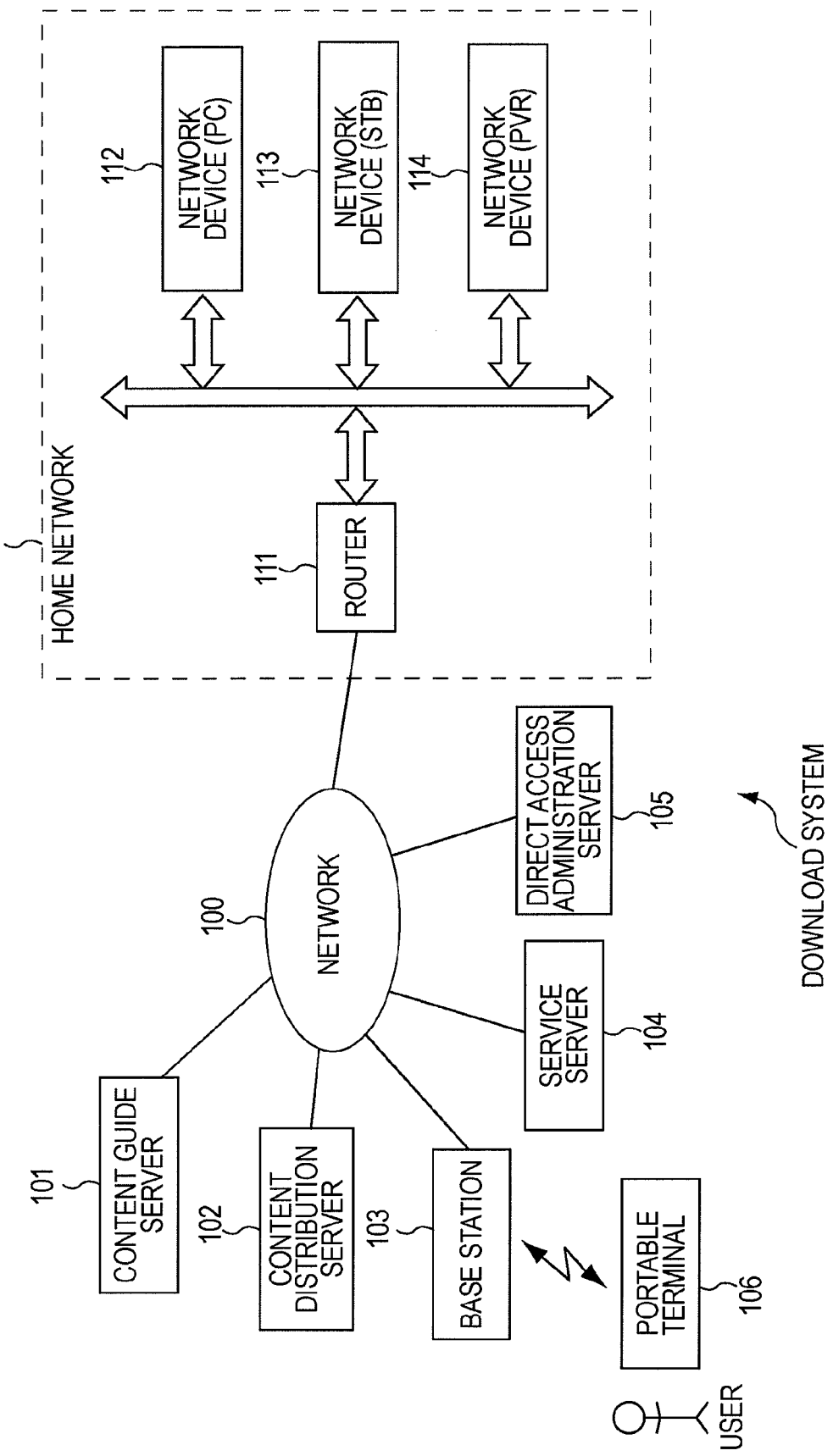
FIG. 1 is a diagram illustrating a configuration example of a download system to which an embodiment of the present invention has been applied.

Before describing an embodiment of the present invention, the correspondence between the features of the claims and the specific elements disclosed in an embodiment of the present invention, with or without reference to drawings, is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

An information processing system according to a first embodiment of the present invention is an information processing system (e.g., the download system in FIG. 1) comprising: first and second information processing devices (e.g., the portable terminal 106 in FIG. 1 and service server 104 in FIG. 1) configured to perform communication through a network; and a third information processing device (e.g., the network device 112 in FIG. 1) for downloading data through the network from a distribution server (e.g., the content distribution server 102 in FIG. 1) configured to distribute data; with the first information processing device including a first transmission unit (e.g., the CPU 141 in FIG. 3 for performing the processing in step S204 in FIG. 8) configured to, in the case of data to be downloaded being selected, transmit a download request for requesting downloading of data to the second information processing device through the network along with data identification information for identifying the data to be downloaded, and device identification information for identifying the third information processing device for performing downloading of data; with the second information processing device including a second transmission unit (e.g., the CPU 131 in FIG. 2 for performing the processing in step S214 in FIG. 8) configured to transmit a download request for requesting downloading of data to the third information processing device identified with the data identification information and the device identification information in response to the download request from the first information processing device; with the third information processing device including a download unit (e.g., the CPU 171 in FIG. 4 for performing the processing in step S259 in FIG. 8) configured to download data identified with the data identification information from the distribution server through the network in response to the download request from the second information processing device.

An information processing device or program according to a second embodiment of the present invention is an information processing device (e.g., the portable terminal 106 in FIG. 1) for performing communication through a network, or a program causing a computer to function as an information processing device, the information processing device comprising: a transmission unit (e.g., the CPU 141 in FIG. 3 for performing the processing in step S204 in FIG. 8) configured to, in the case of data to be downloaded being selected, transmit a download request for requesting downloading of data through the network to a service server (e.g., the service server 104 in FIG. 1) configured to provide a service for controlling downloading of data along with data identification information for identifying the data to be downloaded, and device identification information for identifying a network device (e.g., the network device 112 in FIG. 1) for performing downloading of data.

An information processing method according to a second embodiment of the present invention is an information processing method for an information processing device (e.g., the portable terminal 106 in FIG. 1) configured to perform communication through a network, comprising a step (e.g., step S204 in FIG. 8) of: transmitting, in the case of data to be downloaded being selected, a download request for requesting downloading of data through the network to a service server (e.g., the service server 104 in FIG. 1) configured to provide a service for controlling downloading of data along with data identification information for identifying the data to be downloaded, and device identification information for identifying a network device (e.g., the network device 112 in FIG. 1) for performing downloading of data.

An information processing device or program according to a third embodiment of the present invention is an information processing device (e.g., the service server 104 in FIG. 1) for performing communication through a network, or a program causing a computer to function as an information processing device, the information processing device comprising: a transmission unit (e.g., the CPU 131 in FIG. 2 for performing the processing in step S214 in FIG. 8) configured to transmit, in response to the download request from a terminal (e.g., the portable terminal 106 in FIG. 1) configured to transmit a download request for requesting downloading of data along with data identification information for identifying the data to be downloaded and device identification information for identifying a network device (e.g., the network device 112 in FIG. 1) for performing downloading of data in the case of data to be downloaded being selected, a download request for requesting downloading of data to the network device identified with the device identification information along with the data identification information through the network.

With the information processing device according to the third embodiment, further in the case of the terminal transmitting a download request along with terminal identification information for identifying the terminal, when the terminal identified with the terminal identification information, and the network device identified with the device identification information are correlated and registered, there can be provided a reception unit (e.g., the CPU 131 in FIG. 2 for performing the processing in step S223 in FIG. 8) configured to receive from a providing server (e.g., the direct access administration server 105 in FIG. 1) configured to provide access information necessary for access to the network device identified with the device identification information, the access information, and the transmission unit can access the network device based on the access information to transmit a download request.

An information processing method according to the third embodiment of the present invention is an information processing method for an information processing device (e.g., the service server in FIG. 1) configured to perform communication through a network, comprising a step (e.g., step S214 in FIG. 8) of: transmitting, in response to the download request from a terminal (e.g., the portable terminal 106 in FIG. 1) configured to transmit a download request for requesting downloading of data along with data identification information for identifying the data to be downloaded and device identification information for identifying a network device (e.g., the network device 112 in FIG. 1) for performing downloading of data in the case of data to be downloaded being selected, a download request for requesting downloading of data to the network device identified with the device identification information along with the data identification information through the network.

An information processing device or program according to a fourth embodiment of the present invention is an information processing device (e.g., the network device 112 in FIG. 1) for downloading data from a distribution server (e.g., the content distribution server 102 in FIG. 1) via a network, for distributing data, or a program causing a computer to function as an information processing device, the information processing device comprising: a download unit (the CPU 171 in FIG. 4 for performing the processing in step S259 in FIG. 8) configured to download, in response to the download request from a service server (e.g., the service server 104 in FIG. 1) configured to provide a service for controlling downloading of data by transmitting a download request for requesting downloading of data along with data identification information for identifying the data to be downloaded through the network, the data identified with the data identification information from the distribution server through the network.

With the information processing device according to the fourth embodiment, there can be further provided a reception unit (e.g., the CPU 171 in FIG. 4 for performing the processing in step S252 in FIG. 8) configured to receive a downloadable date whereby downloading of data can be performed, and a determining unit (e.g., the CPU 171 in FIG. 4 for performing the processing in step S257 in FIG. 8) configured to determine whether or not the data identified with the data identification information can be download based on the downloadable date, and in a case wherein determination is made that the data identified with the data identification information can be download, the download unit can download the data identified with the data identification information.

An information processing method according to the fourth embodiment of the present invention is an information processing method for an information processing device (e.g., the network device 112 in FIG. 1) configured to download data through a network from a distribution sever (e.g., the content distribution server 102 in FIG. 1) for distributing data, comprising a step (e.g., step S259 in FIG. 8) of: downloading, in response to the download request from a service server (e.g., the service server 104 in FIG. 1) configured to provide a service for controlling downloading of data by transmitting a download request for requesting downloading of data along with data identification information for identifying the data to be downloaded through the network, the data identified with the data identification information from the distribution server through the network.

Description will be made below regarding an embodiment of the present invention with reference to the drawings.

FIG. 1 illustrates a configuration example of an embodiment of a download system serving as an information processing system (here, "system" means a logical group of multiple devices regardless of whether or not each component device is in the same casing) to which an embodiment of the present invention has been applied.

In FIG. 1, the download system is configured of a network 100, content guide server 101, content distribution server 102, base station 103, service server 104, direct access administration server 105, portable terminal 106, and home network 107, and the content guide server 101, content distribution server 102, base station 103, service server 104, direct access administration server 105, and home network 107 are connected to a network 100 such as the Internet or the like, for example.

The content guide server 101 transmits a content guide serving as information relating to (the data of) a content to be downloaded which the content distribution server 102 distributes, through the network 100. The content distribution server 102 distributes (transmits) (the data of) a predetermined content through the network 100. The base station 103 communicates with not only the portable terminal 106 such as a cellular phone or the like, but also a terminal capable of wireless communication (wireless terminal), thereby relaying communication between the wireless terminal and network 100. The service server 104 provides a service for controlling downloading of data through the network 100.

The direct access administration server 105 provides the service server 104 with a service whereby the service server 104 can perform so-called NAT (Network Address Translation) transversal (router transversal), for example, to communicate directly with (direct access to) a later-described network device 112 or the like of the home network 107 through the network 100, using the XMPP (Extensible Messaging and Presence Protocol).

The portable terminal 106 is, for example, a cellular phone or the like in possession of the user of the home network 107, whereby telephone call or the like can be performed with another unshown cellular phone through the base station 103, and also communication can also be performed with the network 100 through the base station 103.

The home network 107 is, for example, a LAN (Local Area Network) configured at the house of the user of the portable terminal 106, and is configured of a router 111, and three network devices 112, 113, and 114 in FIG. 1.

The router 111 is connected to the network 100, and network devices 112 through 114, and performs route control or the like for communicating with each of the network 100, network devices 112 through 114. The network devices 112 through 114 are, for example, devices capable of downloading data from a distribution server for distributing data, such as the content distribution server 102 or the like, through the network 100, and router 111, and makes up the home network 107 by being connected to the router 111.

Note that various types of devices, for example, a PC, STB, PVR (Personal Video Recorder), HDR (Hard Disk Recorder), or the like can be employed as each of the network devices 112 through 114. In FIG. 1, a PC is employed as the network device 112, an STB is employed as the network device 113, and a PVR is employed as the network device 114, respectively.

Now, with the home network 107, the so-called LAN side (the side connected to the network devices 112 through 114) of the router 111, and the network devices 112 through 114 are provided with a local IP (Internet Protocol) address, and the so-called WAN side (the side connected to the network 100) of the router 111 is provided with a global IP address.

Therefore, with the home network 107, in a case wherein, of the LAN side, for example, the network device 112 accesses to the network 100 through the router 111, NAT is performed at the router 111 wherein the local IP address of the network device 112 is transformed to the global IP address of the WAN side of the router 111.

Subsequently, the response from the network 100 as to the access of the network device 112 is transmitted to the global IP address of the router 111, and when receiving the response from the network 100 as to the access of the network device 112, the router 111 transmits the response thereof to the local IP address of the network device 112.

On the other hand, in the case of accessing, for example, the network device 112 at the LAN side of the home network 107, there is the need to provide information such as the global IP address of the router 111, a port number (the port number of a port provided for the router 111 accessing the network device 112 from the WAN side) representing the access to the network device 112 provided with the local IP address, and so forth. If such information necessary for access to the network device 112 or the like on the LAN side is taken as access information, the above-mentioned direct access administration server 105 provides the service server 104 with access information, thereby providing a DAP service which is a service for allowing the service server 104 to perform NAT transversal (router transversal).

With the download system thus configured, when the user instructs to download a desired content from the content distribution server 102, for example, by operating the network device 112 of the home network 107, the network device 112 accesses to the content distribution server 102 through the router 111 and network 100 to download the desired content from the content distribution server 102 through the network 100 and router 111. The other network devices 113 and 114 can also download a desired content in the same way as with the network device 112.

Here, both of the network devices 112 and 114 can perform the same processing regarding downloading. Hereafter, as long as there is no need in particular, of the network devices 112 through 114, for example, description will be made focusing on the network device 112.

Now, as described above, if we say that downloading of a content from the content distribution server 102 by the user directly operating the network device 112 is called direct operation download, the network device 112 can perform not only direct operation download but also remote download for downloading a content from the content distribution server 102 through the network 100 and router 111 in response to a download request through the network 100 and router 111.

Specifically, with remote downloading, for example, when the user operates his/her own portable terminal 106 away from home to select a desired content as a downloading object, the service server 104 performs NAT transversal through the network 100 to access the network device 112 and request downloading of a desired content.

In response to the request from the service server 104, the network device 112 accesses to the content distribution server 102 through the router 111 and network 100 to download the desired content from the content distribution server 102 through the network 100 and router 111. Therefore, even if the user is away from home, i.e., the network device 112 is not at that location, a desired content can be downloaded to the network device 112. As a result thereof, in a case wherein the user operates the portable terminal 106 to find a desired content to be downloaded while away from home, the user can immediately operate the portable terminal 106 to download the desired content to the network device 112 at home without returning home.

Now, in FIG. 1, with regard to the content guide server 101, content distribution server 102, service server 104, and direct access administration server 105, each of these may be configured of physically independent single hardware, or two or more of these may be configured of single hardware. Note that, hereafter, let us say that the content guide server 101, content distribution server 102, service server 104, and direct access administration server 105 are each configured of single independent hardware.

Figure 2:
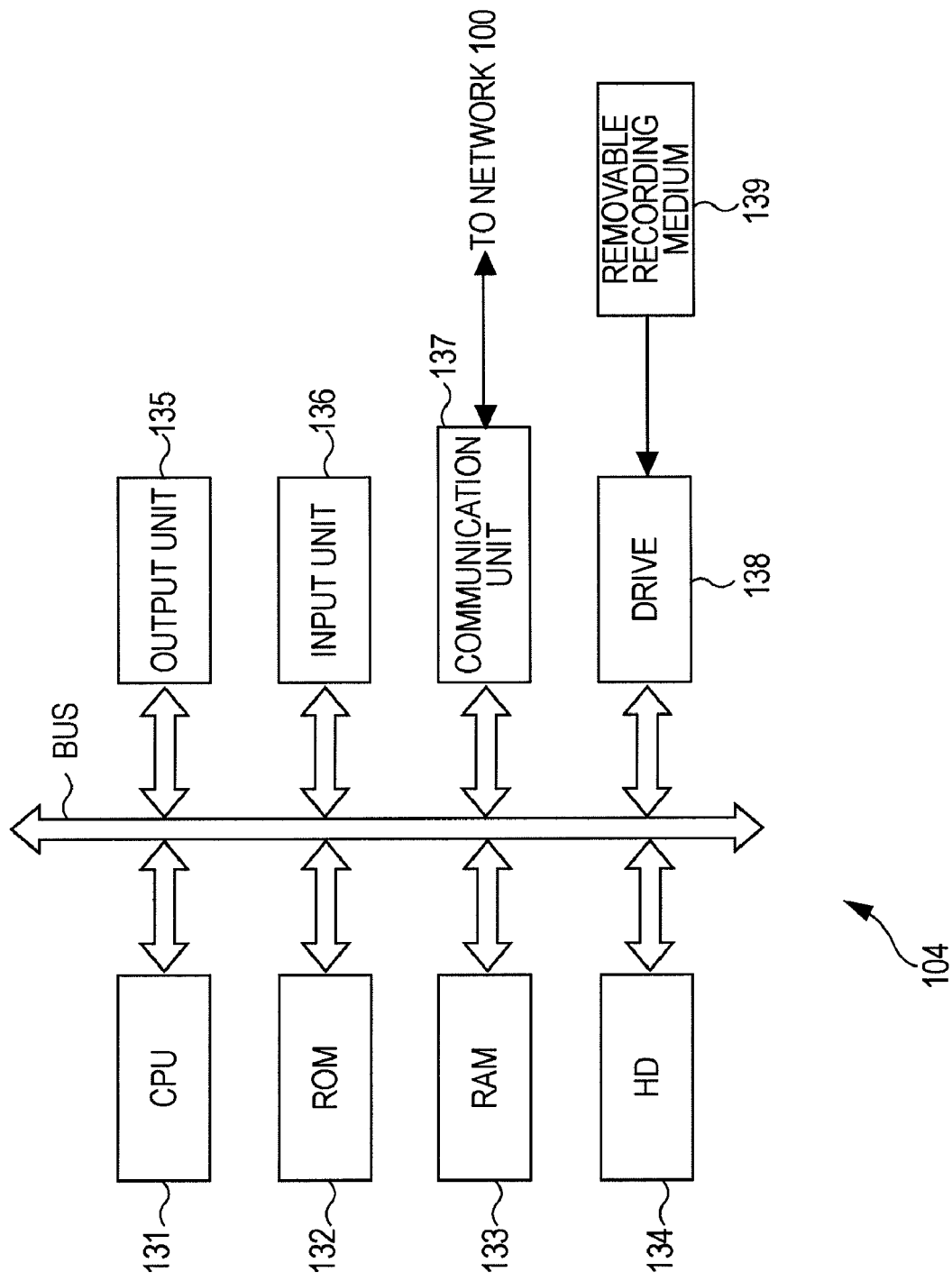
FIG. 2 is a block diagram illustrating a hardware configuration example of a service server 104.

FIG. 2 is a block diagram illustrating a hardware configuration example of the service server 104 shown in FIG. 1. In FIG. 2, the service server 104 is configured of a CPU 131 (Central Processing Unit) 131, ROM (Read Only Memory) 132, RAM (Random Access Memory) 133, HD (Hard Disk) 134, output unit 135, input unit 136, communication unit 137, and drive 138, which are mutually connected through a bus.

The CPU 131 executes a program stored in the ROM 132 or RAM 133 to control each block making up the service server 104, and also performs a service for controlling downloading of data, i.e., for example, processing necessary for providing a service (hereafter, referred to as a download control service as appropriate) for performing control the network device 112 to download a content from the content distribution server 102.

The ROM 132 stores a program and so forth executed by the CPU 131. The RAM 133 temporarily stores a program executed by the CPU 131, and data and so forth necessary for operating the CPU 131. The HD 134 stores a program executed by the CPU 131, and data and so forth necessary for operating the CPU 131.

The output unit 135 is configured of, for example, an LCD (Liquid Crystal Display), speaker, or the like, displays an image, and outputs audio. The input unit 136 is configured of a keyboard, mouse, microphone, and so forth. The communication unit 137 is connected to the network 100, and performs exchange (communication) of necessary data with the network 100.

The drive 138 can be detachably mounted with a removable recording medium 139, such as a flexible disk, CD-ROM (Compact Disc Read Only Memory), MO (Magneto Optical) disk, DVD (Digital Versatile Disc), magnetic disk, semiconductor memory, or the like. The drive 138 drives the removable recording medium 139 mounted thereupon, records data supplied from the bus in the removable recording medium 139, or reads out data from the removable recording medium 139 to output this on the bus.

With the service server 104 thus configured, the CPU 131 reads out a program from the HD 134, and renders this on the RAM 133 to execute this. Thus, the service server 104 provides a download control service for controlling downloading of data.

Note that the program executed by (the CPU 131 of) the service server 104 can be installed in (the HD 134 of) the service server 104 beforehand. Also, the program may be stored in the removable medium 139, installed in the service server 104 from the removable medium 139, or downloaded from an unshown download site connected to the network 100, whereby the program can be installed in the service server 104. This is true for a later-described program executed by the portable terminal 106 shown in FIG. 3, and a later-described program executed by the network device 112 shown in FIG. 4.

Note that at least a program for functioning the service server 104 as a server for providing a download control service is installed in the service server 104, and the service server 104 functions as a server for providing a download control service by the CPU 131 executing the program thereof.

Figure 3:
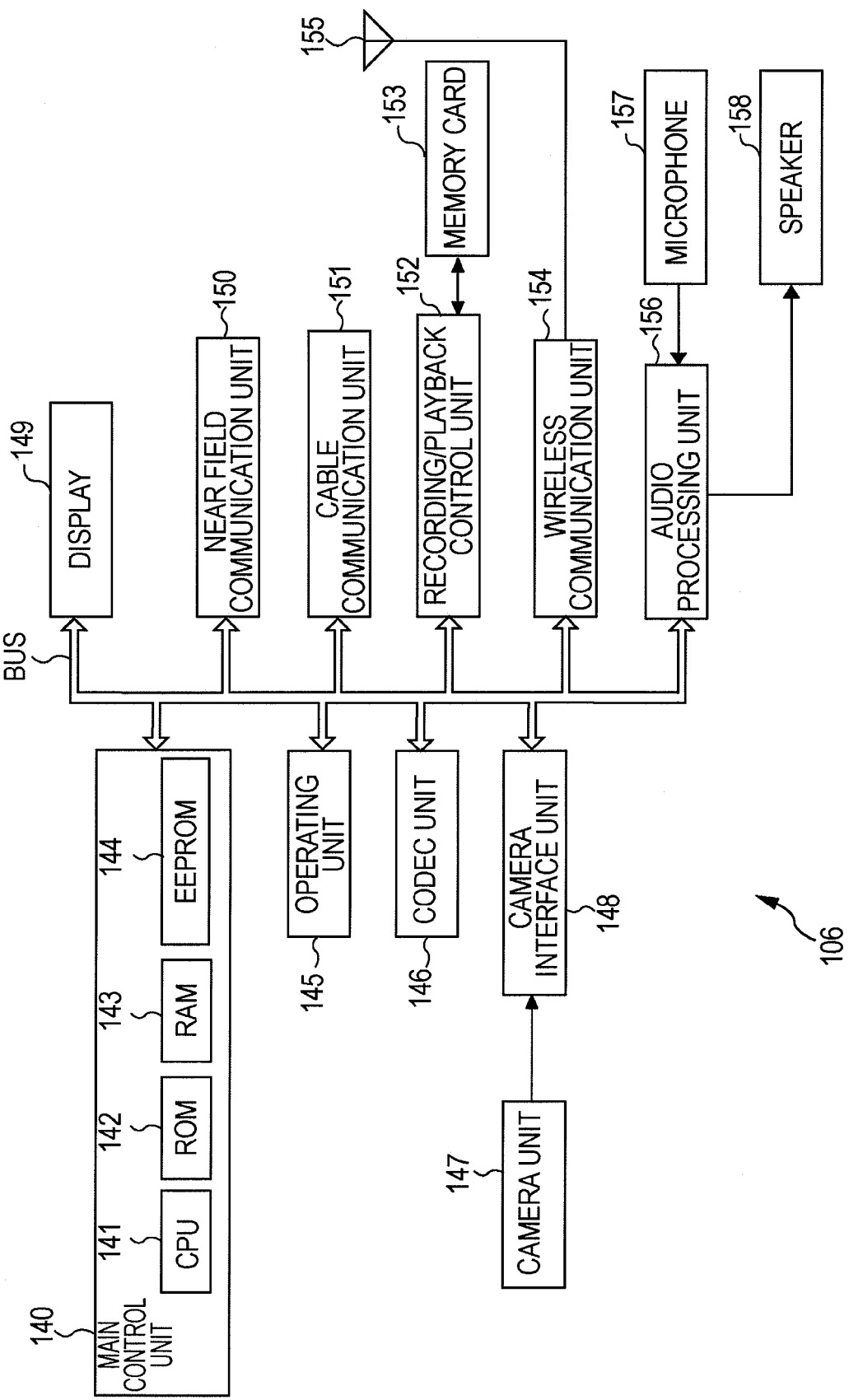
FIG. 3 is a block diagram illustrating a hardware configuration example of a portable terminal 106.

FIG. 3 is a block diagram illustrating a configuration example of the portable terminal 106 shown in FIG. 1. The portable terminal 106 includes a main control unit 140 for integrally controlling each unit thereof. An operating unit 145, codec unit 146, camera interface unit 148, display 149, near field communication unit 150, cable communication unit 151, recording/playback control unit 152, wireless communication unit 154, and audio processing unit 156 are mutually connected to the main control unit 140 through the bus.

The main control unit 140 is configured of the CPU 141, ROM 142, RAM 143, and EEPROM (Electrically Erasable Programmable Read-only Memory) 144, and performs control and the other processing of each unit through the bus by the CPU 141 executing the program stored in the ROM 142, program loaded in the RAM 143, or program stored in the EEPROM 144.

The program executed by the CPU 141 can be installed in the ROM 142 or EEPROM 144 beforehand. Also, the program can be downloaded to the portable terminal 106 by communication through the base station 103 (FIG. 1) to be installed in the EEPROM 144. Further, the program can also be recorded (stored) in a memory card 153, and read out by the recording/playback control unit 152 to be installed in the EEPROM 144.

The operating unit 145 is configured of buttons, a jog dial, or the like, and is operated by the user. When being operated by the user, the operating unit 145 outputs the operating signal corresponding to the operation thereof on the bus.

The codec unit 146 encodes baseband image data, audio data, and so forth supplied from the bus in accordance with a predetermined encoding method (codec), and outputs this on the bus. Also, the codec unit 146 decodes the data encoded with a predetermined encoding method supplied from the bus to baseband image data, audio data, and so forth, and outputs this on the bus.

The camera unit 147 is configured of, for example, a CCD (Charge Coupled Device), CMOS (Complementary Metal Oxide Semiconductor) sensor, or the like, receives light, and outputs the corresponding image data to the camera interface unit 148. The camera interface unit 148 subjects the image data from the camera unit 147 to necessary processing, and outputs this on the bus. The display 149 is configured of, for example, an LCD or the like, and displays the image corresponding to the image data supplied from the bus.

The near field communication unit 150 performs exchange of data by performing near field (or noncontact) wireless communication (near field communication), for example, such as infrared communication, communication by Bluetooth (registered trademark), communication conforming to ISO/IEC 14443 standard, or the like, in accordance with the control of (the CPU 141 of) the main control unit 140. That is to say, the near field communication unit 150 transmits the data supplied from the bus by near field communication, or receives the data transmitted by near field communication to output this on the bus.

The cable communication unit 151 performs cable communication conforming to specifications, such as USB (Universal Serial Bus), IEEE (Institute of Electrical and Electronics) 1394, or the like in accordance with the control of the main control unit 140, thereby performing exchange of data. That is to say, the cable communication unit 151 transmits the data supplied from the bus by cable communication, or receives data transmitted by cable communication to output this on the bus.

The memory card 153 can be detachably mounted on the recording/playback control unit 152. The recording/playback control unit 152 reads out (plays) data from the memory card 153 in accordance with the control of the main control unit 140 to output this on the bus, or writes (records) the data supplied from the bus in the memory card 153. The memory card 153 has built-in nonvolatile memory such as EEPROM or the like. Data is read or written as to the memory card 153 by the recording/playback control unit 152.

The wireless communication unit 154 performs wireless communication with the base station 103 (FIG. 1) through an antenna 155. That is to say, the wireless communication unit 154 outputs the signal corresponding to the data supplied from the bus to the antenna 155, or outputs the data corresponding to the signal supplied from the antenna 155 on the bus. The antenna 155 transmits the signal from the wireless communication unit 154 to the base station 103 by electric waves, or receives the electric waves transmitted from the base station 103 to supply the corresponding signal to the wireless communication unit 154.

The audio processing unit 156 subjects the audio signal supplied from the microphone 157 to necessary audio processing such as A/D (Analog/Digital) conversion processing or the like, and outputs this on the bus. Also, the audio processing unit 156 subjects the audio data supplied from the bus to necessary audio processing such as D/A (Digital/Analog) conversion or the like, and supplies this to the speaker 158. The microphone 157 collects audio (sound), and supplies the corresponding audio signal to the audio processing unit 156. The speaker 158 outputs the audio corresponding to the audio signal supplied from the audio processing unit 156.

With the portable terminal 106 thus configured, for example, at the time of audio call mode for performing a call by audio, the audio signal collected by the microphone 157 is transmitted to the base station 103 through the audio processing unit 156, bus, wireless communication unit 154, and antenna 155.

Also, the electric waves from the base station 103 are received at the antenna 155, and the corresponding audio signal is supplied to the speaker 158 through the wireless communication unit 154, bus, and audio processing unit 156, and the corresponding audio is output.

Further, with the portable terminal 106, in a case wherein the user creates an e-mail, and operates the operating unit 145 so as to transmit the e-mail thereof, the text data of the e-mail is supplied to the wireless communication unit 154 from the main control unit 140 through the bus. The wireless communication unit 154 transmits the text data of the e-mail from the main control unit 140 to the base station 103 through the antenna 155.

Also, in the case of the text data of the e-mail being transmitted from the base station 103, the text data of the e-mail thereof is received at the antenna 155, and is supplied to the display 149 through the wireless communication unit 154 and bus, and is displayed. Note that with the portable terminal 106, a web page and other data can be exchanged in the same way as with the text data of the e-mail.

Specifically, with the portable terminal 106, when the operating unit 145 is operated so as to request a web page for example, the request thereof is transmitted to the base station 103 from the wireless communication unit 154 through the antenna 155. Subsequently, when the data of the web page is transmitted from the base station 103 in response to the web page request, the data of the web page thereof is received at the wireless communication unit 154 through the antenna 155, and supplied to the main control unit 140.

The main control unit 140 interprets the data of the web page, and creates a screen (image) based on the interpretation thereof. This screen is supplied to the display 149 from the main control unit 140 through the bus, and is displayed.

Specifically, at least a web browser program is installed in the EEPROM 144 of the main control unit 140, and the CPU 141 executes the program thereof to function as a web browser, and performs interpretation of the data of web pages, or the like.

Figure 4:
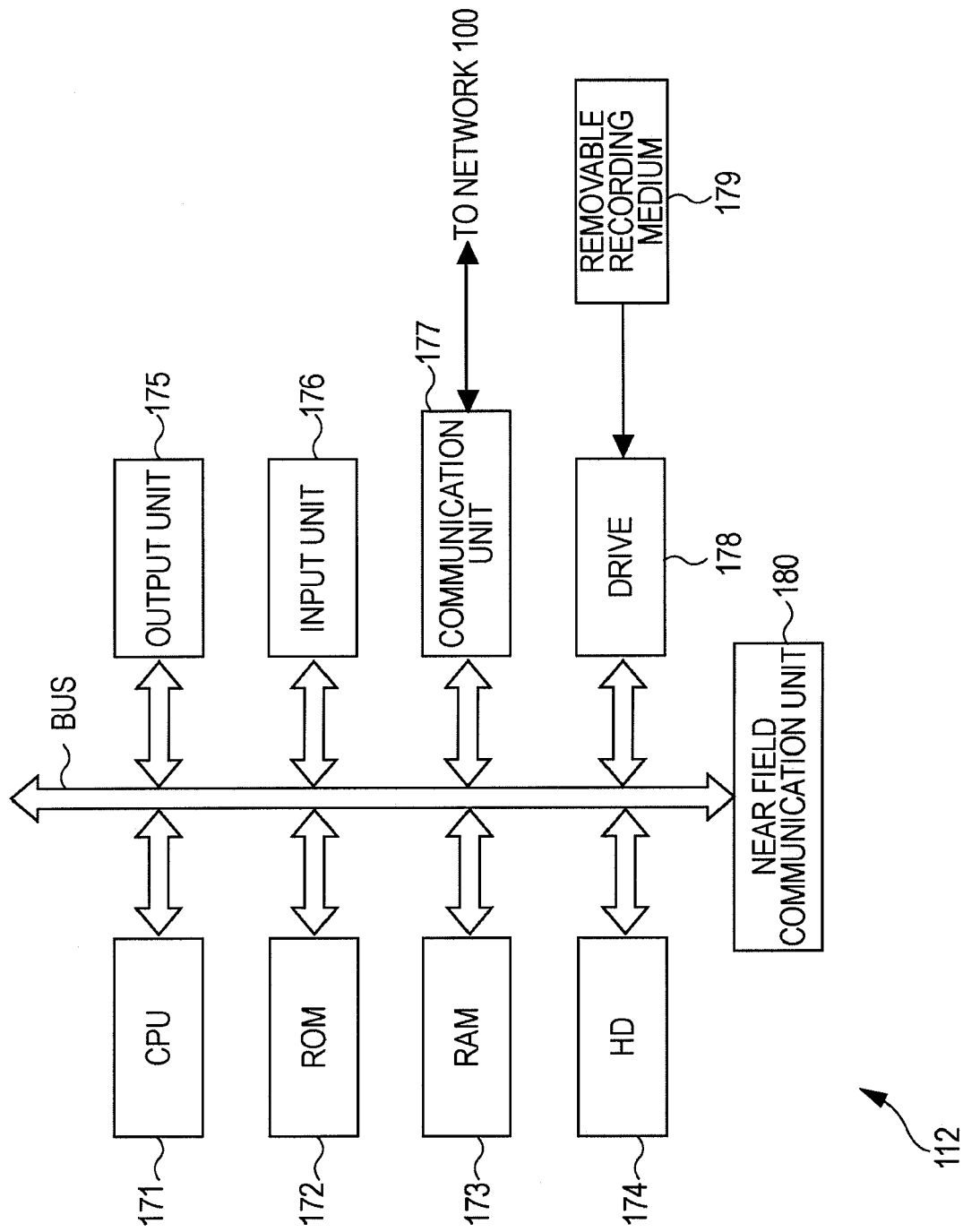
FIG. 4 is a block diagram illustrating a hardware configuration example of a network device 112.

FIG. 4 is a block diagram illustrating a hardware configuration example of the network device 112 shown in FIG. 1. In FIG. 4, the network device 112 is configured by being mutually connected to a CPU 171, ROM 172, RAM 173, HD 174, output unit 175, input unit 176, communication unit 177, drive 178, and near field communication unit 180 through the bus.

With the network device 112, the CPU 171, ROM 172, RAM 173, HD 174, output unit 175, input unit 176, communication unit 177, and drive 178 are configured in the same way as the CPU 131, ROM 132, RAM 133, HD 134, output unit 135, input unit 136, communication unit 137, and drive 138 of the service server 104 shown in FIG. 2, respectively, so description thereof will be omitted.

The near field communication unit 180 performs near field communication with the near field communication unit 150 of the portable terminal 106.

Note that the program installed in the network device 112 differs from the program installed in the service server 104 shown in FIG. 2. Specifically, at least a program causing the network device 112 to function as a client for receiving provision of a download control service is installed in the network device 112, and the CPU 171 executes the program thereof, whereby the network device 112 functions as a client for receiving provision of a download control service.

Note that the program executed by (the CPU 171 of) the network device 112 can be installed in (the HD 174 of) the network device 112 beforehand. Also, the program may be stored in a removable recording medium 179 such as DVD or the like, and installed from the removable recording medium 179 to the network device 112, or may be downloaded from an unshown download site connected to the network 100, and installed to the network device 112.

Next, FIG. 5 illustrates an example of a content guide provided by the content guide server 101 shown in FIG. 1. In FIG. 5, the content guide is configured of content IDs (Identifications), content titles, downloadable dates, and download URLs (Uniform Resource Locators) (URIs (Uniform Resource Identifiers)).

The content IDs are data identification information for identifying (the data of) a content distributed by the content distribution server 102, and the content titles are the titles of contents. The downloadable dates represent dates when a content can be downloaded from the content distribution server 102 (downloading can be started), and the download URLs represent positions on the network 100 where contents exist. With the content guide, with regard to each content which the content distribution server 102 distributes, the content ID, content title, downloadable date, and download URL of the content thereof are correlated. Note that the content guide can additionally include, for example, detailed information representing the detailed content of contents.

Also, the downloadable dates are one of conditions regarding whether or not contents can be download (download conditions), and the content guide can include download conditions other than the downloadable dates, i.e., for example, conditions such as content downloadable periods, content downloadable users (e.g., users who have paid remuneration to contents), and so forth.

Further, the download conditions including downloadable dates, and download URLs (the same goes for a later-described download control information acquisition URLs in FIG. 11), which differ for each type (e.g., PC, STB, PVR, etc.) of the network device for performing downloading can be employed.

Next, description will be made regarding the direct operation download processing performed at the download system shown in FIG. 1 with reference to FIG. 6. With the direct operation download processing, as described above, the network device 112 is operated by the user, and in response to the operations thereof, downloading of a content is performed from the content distribution server 102.

Specifically, when operations are performed by the user so as to obtain the content guide, or periodically, or on an irregular basis, in step S101 the network device 112 accesses to the content guide server 101 through the router 111 and network 100 to transmit a content guide request for requesting the content guide.

In step S111, the content guide server 101 receives the content guide request from the network device 112. Subsequently, in step S112, in response to the content guide request from the network device 112, the content guide server 101 transmits the content guide to the network device 112 through the network 100 and router 111.

In step S102, the network device 112 receives the content guide from the content guide server 101, and displays this on the output unit 175 (FIG. 4).

Subsequently, in step S103, the network device 112 determines whether or not the user has selected a content to be downloaded.

In a case wherein determination is made in step S103 that a content to be downloaded has not been selected, the processing returns to step S103, and hereafter, the same processing is repeated.

Also, in a case wherein determination is made in step S103 that a content to be downloaded has been selected, i.e., in a case wherein the user has viewed the content guide displayed on the output unit 175 (FIG. 4), and of thereof, has operated the input unit 176 (FIG. 4) so as to select a desired content (of the content guide), the network device 112 takes the content selected by the user as a content to be downloaded, and the processing proceeds to step S104.

In step S104, the network device 112 determines whether or not the content to be downloaded can be downloaded, for example, with reference to the downloadable date of the content guide (FIG. 5) received in step S102.

In a case wherein determination is made in step S104 that the content to be downloaded is not downloadable, i.e., for example, in a case wherein, with the content guide, the date represented with the downloadable date correlated with the content ID of the content to be downloaded is date in the future, and accordingly, distribution of the content to be downloaded has not been started yet by the content distribution server 102, the processing returns to step S104, where the network device 112 awaits until the date represented with the downloadable date correlated with the content ID of the content to be downloaded comes.

Also, in a case wherein determination is made in step S104 that the content to be downloaded is downloadable, i.e., for example, in a case wherein, with the content guide, the date represented with the downloadable date correlated with the content ID of the content to be downloaded has elapsed, and accordingly, distribution of the content to be downloaded has been started by the content distribution server 102, the processing proceeds to step S105, where the network device 112 transmits a content request for requesting downloading of the content represented with the download URL correlated with the content ID of the content to be downloaded, of the content guide, and the content ID of the content to be downloaded, to the content distribution server 102 through the router 111 and network 100 based on the download URL thereof.

In step S121, the content request and content ID transmitted by the network device 112 is received at the content distribution server 102. Subsequently, in step S122, in response to the content request from the network device 112, the content distribution server 102 transmits the content identified with the content ID from the network device 112 to the network device 112 through the network 100 and router 111.

In step S106, the network device 112 receives the content from the content distribution server 102, thereby performing downloading of the content to be downloaded. Subsequently, in step S107, the network device 112 records (stores) the content to be downloaded in the HD 174.

Next, description will be made regarding the remote download processing performed at the download system shown in FIG. 1. With the remote download, for example, as described above, when the user operating his/her own portable terminal 106 away from home, in response to the operations thereof, the service server 104 performs NAT transversal through the network 100 to access the network device 112, and controls the network device 112 to perform downloading of a content.

In other words, with the download system shown in FIG. 1, the service server 104 provides a download control service for controlling downloading of data by the network device 112 or the like which needs to access with NAT transversal, through the network 100, and the remote download is performed using this download control service.

In order to receive the download control service by the service server 104, there is the need to perform registration for receiving provision of the download control service thereof. Description will be made now regarding registration processing for receiving provision of the download control service with reference to FIG. 7.

The user operates the portable terminal 106 so as to access the service server 104 through the base station 103 and network 100 to perform registration for receiving provision of the download control service.

In step S141, in response to the operations of the user, the portable terminal 106 transmits a registration request for requesting registration for receiving provision of the download control service along with the device ID of the portable terminal 106 to the service server 104 through the base station 103 and network 100.

Here, the device ID is device identification information (terminal identification information) for identifying each device, which is appended to the portable terminal 106 operated by the user, and the network devices 112 through 114 for performing downloading of a content in response to the operations thereof.

Note that, hereafter, with the remote download, the portable terminal 106 or the like which is operated to cause the network device 112 or the like to perform downloading will also be referred to a control device. Also, the network device 112 or the like for performing downloading of a content in response to the operations of the portable terminal 106 or the like serving as a control device will also be referred to as a controlled device. Further, hereafter, as appropriate, the device ID of a control device will be referred to as a control device ID, and the device ID of a controlled device will be referred to as a controlled device ID.

The registration request transmitted by the portable terminal 106, and the control device ID of the portable terminal 106 serving as a control device are received at the service server 104 in step S151. In step S152, the service server 104 transmits the registration request and control device ID from the portable terminal 106 to the direct access administration server 105 through the network 100.

In step S161, the registration request and control device ID transmitted by the service server 104 are received at the direct access administration server 105.

In step S162, the direct access administration server 105 issues a password, and control device and service management ID as to the registration request and control device ID from the service server 104, and correlates the password with the control device and service management ID, and registers these on a table. Now, at the direct access administration server 105, the table in which passwords, and control device and service management IDs are registered, will be referred to as a "device table" hereafter as appropriate.

Subsequently, in step S163, the direct access administration server 105 transmits the password correlated with the control device and service management ID to the service server 104 through the network 100.

In step S153, the service server 104 receives the password from the direct access administration server 105, and the processing proceeds to step S154.

In step S154, the service server 104 transmits the password from the direct access administration server 105 to the portable terminal 106 through the network 100 and base station 103.

In step S142, the password transmitted by the service server 104 is received at the portable terminal 106. In step S143, the portable terminal 106 stores the password from the service server 104.

Subsequently, when the user operates the portable terminal 106 so as to register the network device 112 serving as a controlled device caused to perform downloading in response to the operations of the portable terminal 106 on near the network device 112 for example, in step S144 at the portable terminal 106, the near field communication unit 150 (FIG. 3) transmits the password stored in step S143 to the network device 112 along with the necessary information for access to the direct access administration server (direct access administration server information), such as the URL of the direct access administration server 105, and so forth, for example, using infrared rays.

Note that the direct access administration information has been obtained at the portable terminal 106, for example, by the service server 104 transmitting this along with the password to the portable terminal 106 in step S154 and the portable terminal 106 receiving this in step S142.

The password and direct access administration server information transmitted by the portable terminal 106 using infrared rays are received at the near field communication unit 180 (FIG. 4) of the network device 112 in step S171.

Further, in step S172, the network device 112 stores the password from the portable terminal 106, and the processing proceeds to step S173, where the network device 112 transmits a correspondence request for requesting to register the network device 112 in correlation with the control device and service management ID correlated with the password thereof, and the password from the portable terminal 106 to the direct access administration server 105 through the router 111 and network 100 based on the direct access administration server information from the portable terminal 106.

The correspondence request and password transmitted by the network device 112 are received at the direct access administration server 105 in step S164. In step S165, in response to the correspondence request from the network device 112, the direct access administration server 105 issues a controlled device management ID for administrating the network device 112 as a controlled device. Further, in step S165, the direct access administration server 105 searches the password identical to the password from the network device 112 at the device table, and registers the controlled device management ID in correlation with the control device and service management ID correlated with the password thereof.

Subsequently, in step S166, the direct access administration server 105 issues a controlled device ID to the network device 112, and transmits a registration-completed notification to the effect that registration as to the device table has been completed along with the controlled device ID to the network device 112 through the network 100 and router 111.

The registration-completed notification transmitted by the direct access administration server 105 is received at the network device 112 in step S174.

After the network device 112 receives the registration-completed notification from the direct access administration server 105, a permanent session according to the XMPP is provided between the direct access administration server 105 and network device 112 through the network 100 and router 111, and thus, the direct access administration server 105 becomes a state in which the direct access administration server 105 can access the network device 112 through the network 100 and router 111 at an arbitrary timing.

Thus, after the registration processing for receiving provision of the download control service (FIG. 7) is completed, the remote download can be performed at the download system shown in FIG. 1.

Now, description will be made regarding the remote download processing performed at the download system shown in FIG. 1. When the portable terminal 106 is operated by the user so as to obtain the content guide, or periodically, or on an irregular basis, in step S201 the portable terminal 106 accesses to the content guide server 101 through the base station 103 and network 100 to transmit a content guide request.

In step S231, the content guide server 101 receives the content guide request from the portable terminal 106. Subsequently, in step S232, in response to the content guide request from the portable terminal 106, the content guide server 101 transmits the content guide to the portable terminal 106 through the network 100 and base station 103.

In step S202, the portable terminal 106 receives the content guide from the content guide server 101, and displays this on the display 149 (FIG. 3).

On the other hand, the network device 112 also acquires the content guide from the content guide server 101.

Specifically, in step S251, the network device 112 accesses the content guide server 101 through the router 111 and network 100 periodically or on an irregular basis to transmit a content guide request.

In step S233, the content guide server 101 receives the content guide request from the network device 112. Subsequently, in step S234, in response to the content guide request from the network device 112, the content guide server 101 transmits the content guide to the network device 112 through the network 100 and router 111.

In step S252, the network device 112 receives the content guide from the content guide server 101, and stores this.

On the other hand, in step S203, the portable terminal 106 determines whether or not the content to be downloaded has been selected by the user.

In a case wherein determination is made in step S203 that the content to be downloaded has not been selected, the processing returns to step S203, and hereafter, the same processing is repeated.

Also, in a case wherein determination is made in step S203 that the content to be downloaded has been selected, i.e., in a case wherein the user has viewed the content guide displayed on the display 149 (FIG. 3), and has operated the operating unit 145 (FIG. 3) so as to select a desired content (of the content guide), the portable terminal 106 takes the content selected by the user as the content to be downloaded, and recognizes the content ID thereof from the content guide received in step S202.

Subsequently, the portable terminal 106 awaits until the user selects a controlled device to which the content to be downloaded is downloaded by operating the operating unit 145 (FIG. 3), and in step S204 transmits a download request for requesting the content to be downloaded selected by the user, the content ID of the content to be downloaded, the device ID (control device ID) of the portable terminal 106, and the controlled device ID of the controlled device selected by the user to the service server 104 through the base station 103 and network 100.

Here, at the portable terminal 106, for example, an arrangement is made wherein a device selection screen for selecting a controlled device to which a content is downloaded is displayed on the display 149 (FIG. 3), and the user views the device selection screen to select a controlled device to which a content is downloaded.

For example, when the portable terminal 106 requests the direct access administration server 105 through the service server 104, the direct access administration server 105 creates the device selection screen (list of controlled devices) for selecting a controlled to which a content is downloaded, and transmits this to the portable terminal 106.

The download request, content ID, control device ID, and controlled device ID, transmitted by the portable terminal 106 are received at the service server 104 in step S211.

In step S212, in response to the download request from the portable terminal 106, the service server 104 transmits an access information request for requesting access information necessary for access to the controlled device identified with the controlled device ID from the portable terminal 106 along with the control device ID and controlled device ID from the portable terminal 106 to the direct access administration server 105 through the network 100.

The access information request, control device ID, and controlled device ID, transmitted by the service server 104 are received at the direct access administration server 105 in step S221.

In response to the access information request from the service server 104, the direct access administration server 105 accesses to the controlled device identified with the controlled device ID from the service server 104 to request the access information.

Figure 7:
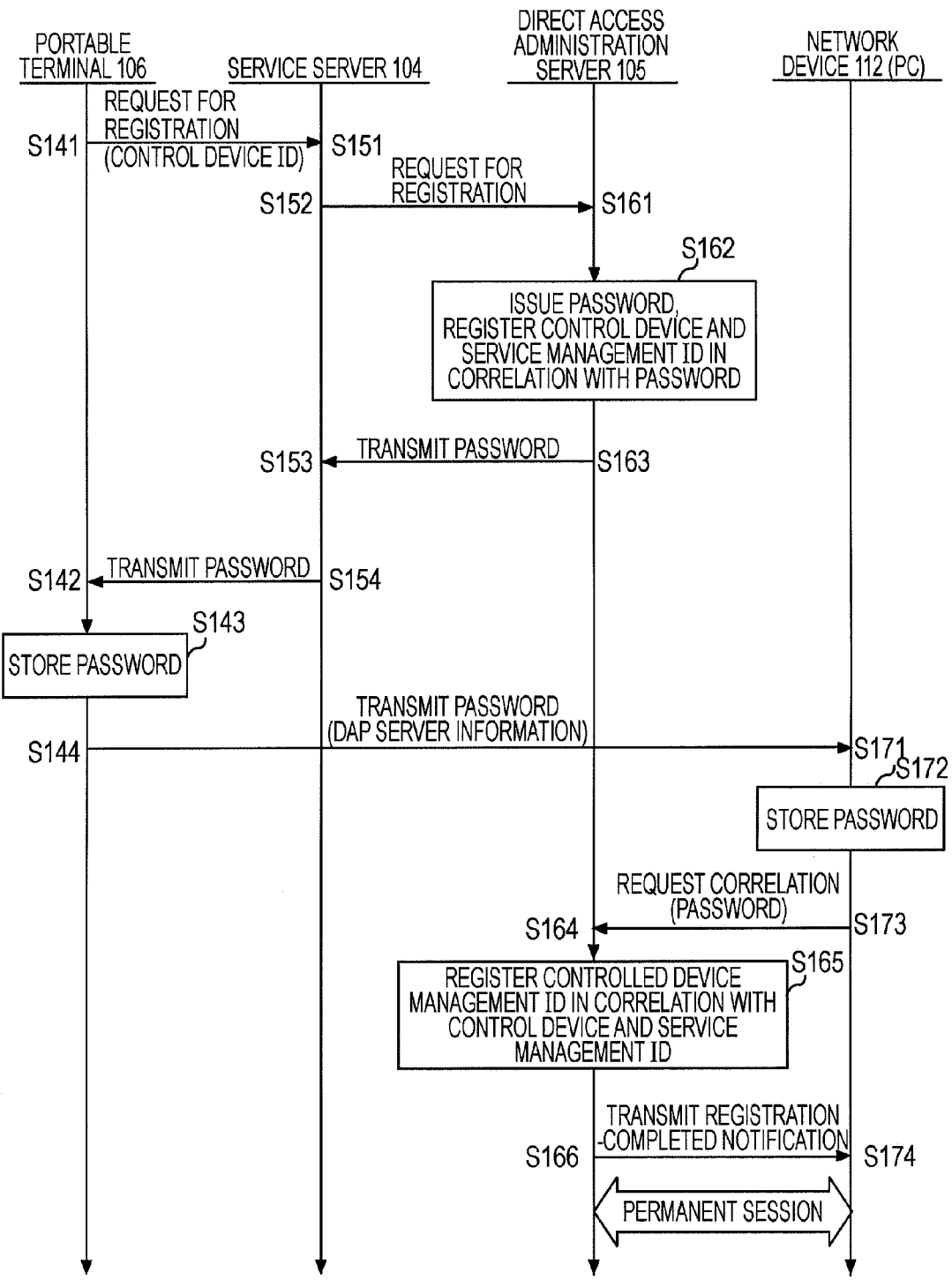
FIG. 7 is a diagram for describing registration processing for receiving provision of a download control service.

Specifically, for example, in a case wherein the controlled device ID from the service server 104 is the device ID of the network device 112, as described with reference to FIG. 7, a permanent session is provided between the direct access administration server 105 and network device 112, so the direct access administration server 105 can access the network device 112 identified with the controlled device ID from the service server 104, i.e., the network device 112 from which access information is requested, through the network 100 and router 111, according to the permanent session.

Accordingly, in step S222, the direct access administration server 105 transmits an access information request to the network device 112 through the network 100 and router 111.

The access information request transmitted by the direct access administration server 105 is received at the network device 112 in step S253.

In step S254, in response to the access information request from the direct access administration server 105, the network device 112 exchanges necessary information with the router 111, dynamically acquires the port of the router 111 to be employed for communication with the service server 104, and obtains access information necessary for access to the network device 112 by NAT transversal, such as the port number of the port thereof, the IP address on the WAN side of the router 111, and so forth.

Subsequently, in step S255, the network device 112 transmits the access information to the direct access administration server 105 through the router 111 and network 100.

The access information transmitted by the network device 112 is received at the direct access administration server 105 in step S223. In step S224, the direct access administration server 105 transmits the access information from the network device 112 to the service server 104 through the network 100.

The access information transmitted by the direct access administration server 105 is received at the service server 104 in step S213.

The service server 104 performs router 111 transversal (NAT transversal) through the network 100 based on the access information from the direct access administration server 105 to access (direct access) the network device 112, and transmits a download request for requesting downloading of the content identified with the content ID received in step S211, and the content ID thereof to the network device 112 through the network 100 and router 111.

The download request and content ID transmitted by the service server 104 are received at the network device 112 in step S256.

Subsequently, in response to the download request from the service server 104, the network device 112 takes the content identified with the content ID from the service server 104 as the content to be downloaded, and performs downloading of the content thereof.

Figure 6:
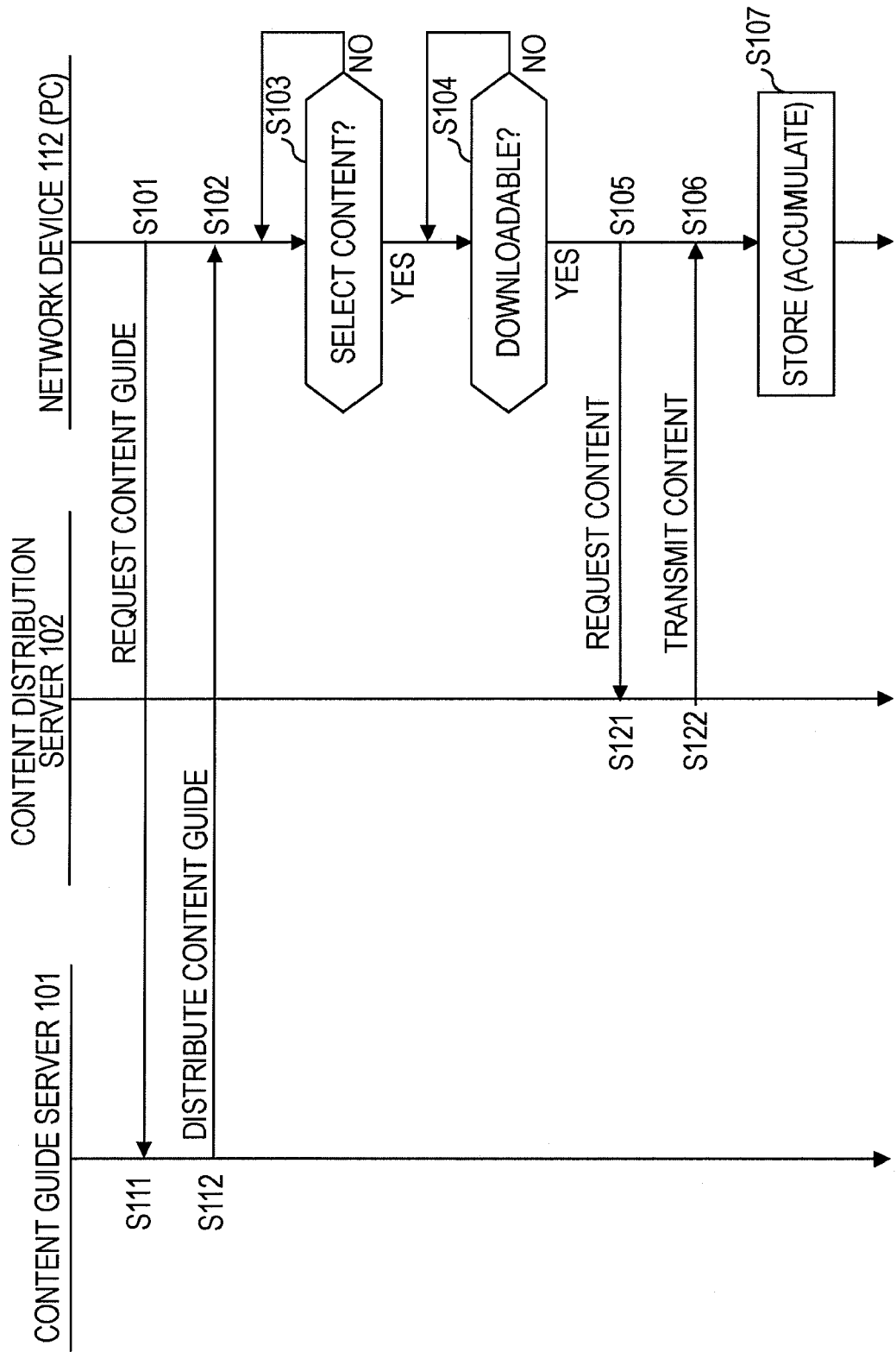
FIG. 6 is a diagram for describing direct operation download processing performed at the download system.

Specifically, in step S257, similar to step S104 shown in FIG. 6, the network device 112 determines whether or not the content to be downloaded is downloadable, for example, with reference to the downloadable date of the content guide received in step S252.

In a case wherein determination is made in step S257 that the content to be downloaded is not downloadable, the processing returns to step S257, where the network device 112 awaits until the data represented with the downloadable date correlated with the content ID of the content to be downloaded comes.

Also, in a case wherein determination is made in step S257 that the content to be downloaded is downloadable, the processing proceeds to step S258, where the network device 112 transmits a content request for requesting downloading of the content represented with the download URL correlated with the content ID of the content to be downloaded, of the content guide, and the content ID of the content to be downloaded, to the content distribution server 102 through the router 111 and network 100 based on the download URL thereof.

In step S241, the content request and content ID transmitted by the network device 112 is received at the content distribution server 102. Subsequently, in step S242, in response to the content request from the network device 112, the content distribution server 102 transmits the content identified with the content ID from the network device 112 to the network device 112 through the network 100 and router 111.

In step S259, the network device 112 receives the content from the content distribution server 102, thereby performing downloading of the content to be downloaded. Subsequently, in step S260, the network device 112 records the content to be downloaded in the HD 174 (FIG. 4).

Incidentally, in a case wherein the content distribution server 102 encodes a content using a predetermined codec (encoding method) and distributes this, there is the need to decode the content thereof at a network device (controlled device) which downloads the content thereof, using a predetermined codec.

On the other hand, there are various types of network devices (controlled devices), for example, such as a PC, STB, PVR, and so forth, and for each type of network device there is codec suitable for the type of network device thereof.

Therefore, at the content distribution server 102, as a content for each of the multiple types of device, a content of a codec suitable for each of the multiple types of device is prepared, and at a network device, a content of a codec suitable for the type of the network device thereof can be downloaded from the content distribution server 102.

Figure 9:
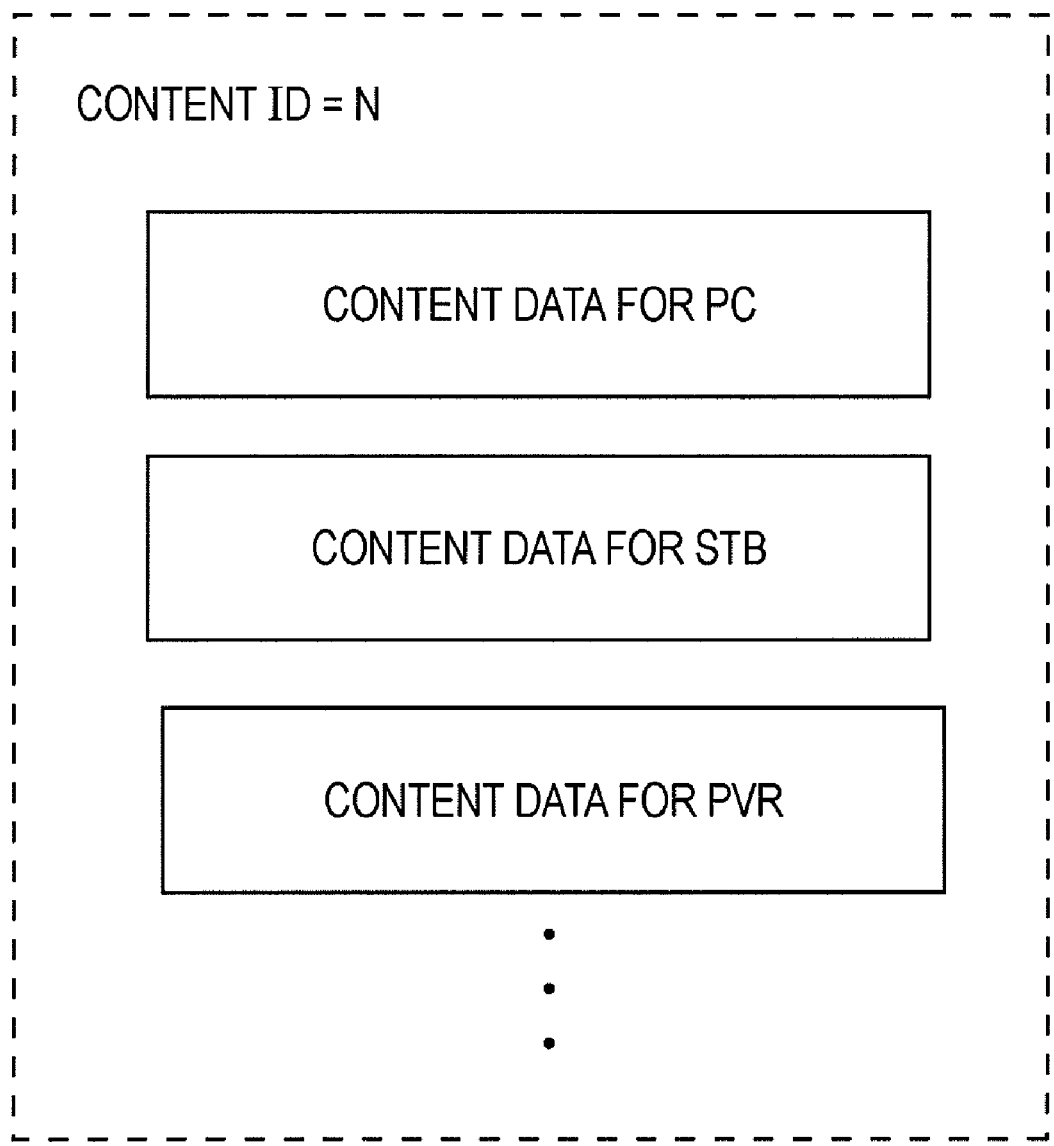
FIG. 9 is a diagram schematically illustrating (the data of) a content stored in a content distribution server 102.

FIG. 9 schematically illustrates (the data of) contents stored in the content distribution server 102. At the content distribution server 102, with regard to the content identified with each content ID, a content for each of the multiple types of network device is stored, for example, such as a content for PC, content for STB, and content for PVR, and in a case wherein there is a download request from a certain type of network device, the content for the type of network device thereof can be distributed.

Note that, similarly, at the content guide server 101, as to a network device or the like, a content guide suitable for the type of the network device or the like can also be provided.

Figure 8:
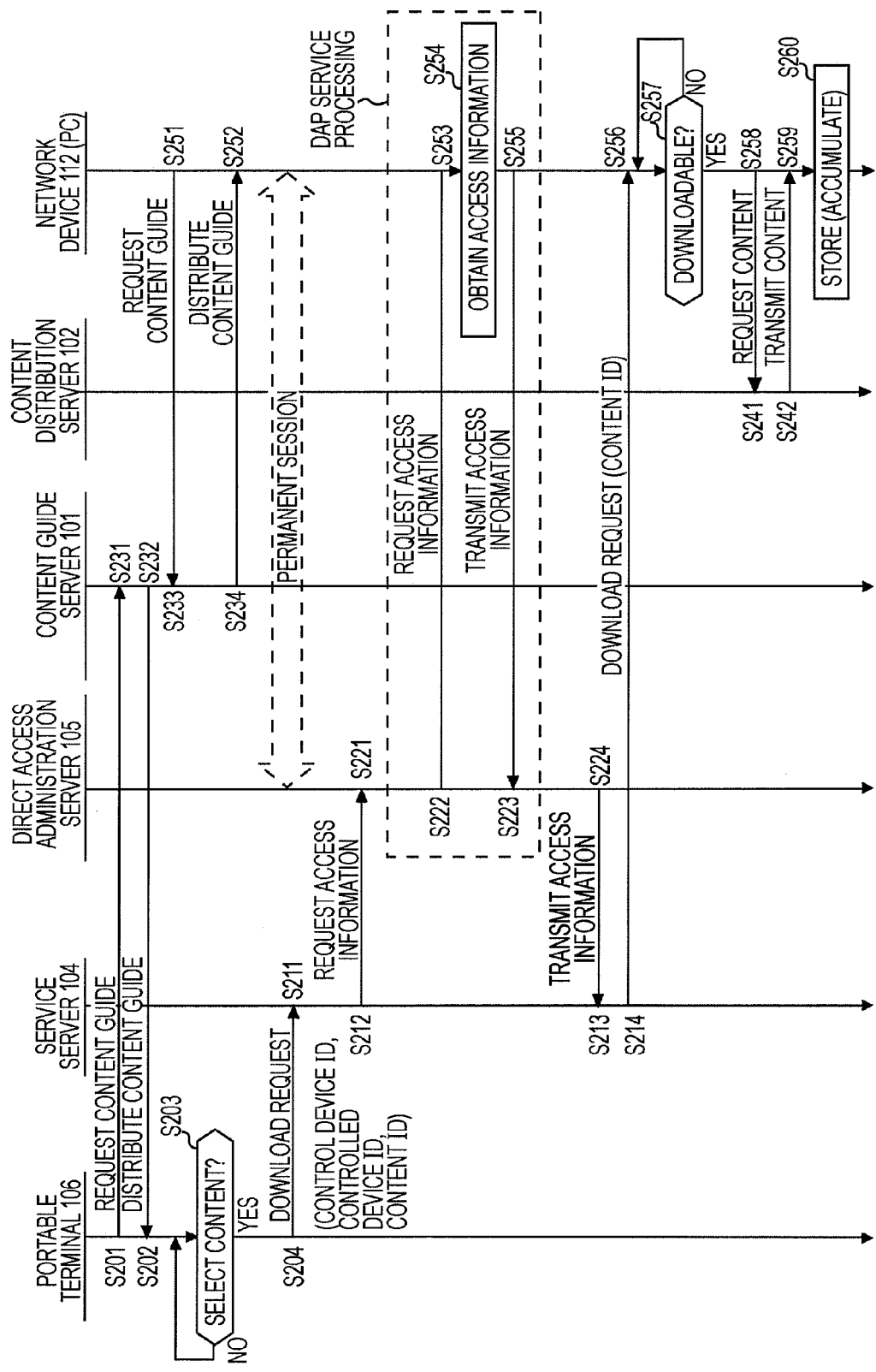
FIG. 8 is a diagram for describing remote download processing performed at the download system.

In the above FIG. 8, an arrangement has been made wherein only the network device 112 serving as a controlled device performs downloading of contents, but with the remote download, downloading of contents can be performed at multiple controlled devices.

Figure 10:
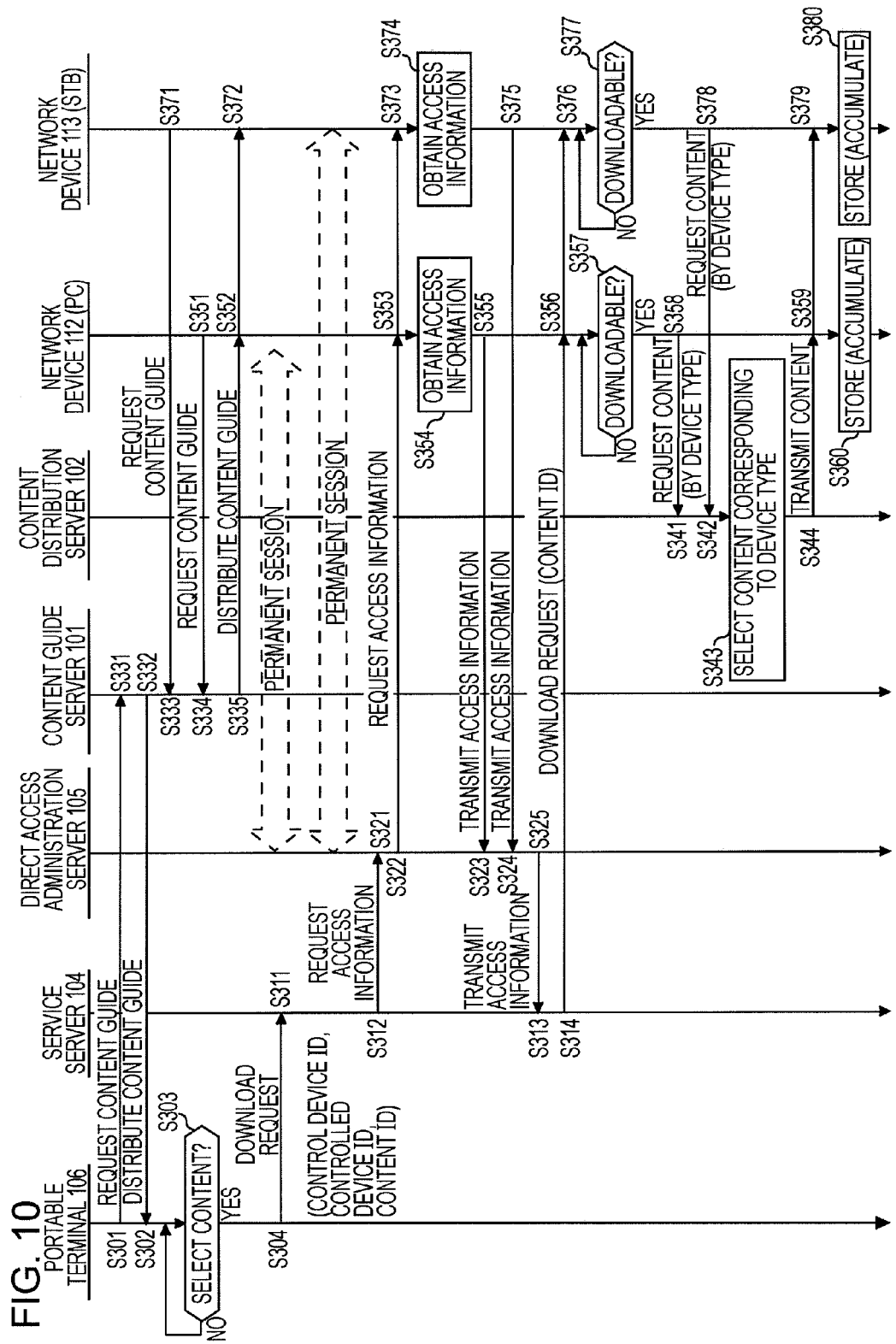
FIG. 10 is a diagram for describing the remote download processing wherein multiple controlled devices download a content.

Now, description will be made with reference to FIG. 10 regarding the remote download processing wherein multiple controlled devices download contents. In FIG. 10, let us say that the registration processing shown in FIG. 7 is performed at not only the network device 112 but also the network device 113, and thus, the network devices 112 and 113 are registered as controlled devices on the device table of the direct access administration server 105 as to the portable terminal 106 serving as a control device. Also, in FIG. 10, as described with reference to FIG. 9, let us say that the content distribution server 102 stores the content for each of multiple types of network device.

When the portable terminal 106 is operated by the user so as to obtain the content guide, or periodically, or on an irregular basis, in step S301 the portable terminal 106 accesses the content guide server 101 to transmit a content guide request.

In step S331, the content guide server 101 receives the content guide request from the portable terminal 106, via the base station 103 and network 100. Subsequently, in step S332, in response to the content guide request from the portable terminal 106, the content guide server 101 transmits the content guide to the portable terminal 106 through the network 100 and base station 103.

In step S302, the portable terminal 106 receives the content guide from the content guide server 101, and displays this on the display 149 (FIG. 3).

On the other hand, the network devices 112 and 113 also acquire the content guide from the content guide server 101.

Specifically, in step S351, the network device 112 accesses the content guide server 101 through the router 111 and network 100 periodically or on an irregular basis to transmit a content guide request.

Similarly, in step S371, the network device 113 accesses the content guide server 101 through the router 111 and network 100 periodically or on an irregular basis to transmit a content guide request.

The content guide request from the network device 113 is received at the content guide server 101 in step S333, and the content guide request from the network device 112 is received at the content guide server 101 in step S334.

In step S335, in response to the content guide requests from the network devices 112 and 113, the content guide server 101 transmits the content guide to the network devices 112 and 113 through the network 100 and router 111.

In step S352, the network device 112 receives the content guide from the content guide server 101, and stores this.

Similarly, in step S372, the network device 113 receives the content guide from the content guide server 101, and stores this.

On the other hand, in step S303, the portable terminal 106 determines whether or not the content to be downloaded has been selected by the user.

In a case wherein determination is made in step S303 that the content to be downloaded has not been selected, the processing returns to step S303, and hereafter, the same processing is repeated.

Also, in a case wherein determination is made in step S303 that the content to be downloaded has been selected, i.e., in a case wherein the user has viewed the content guide on the display 149 (FIG. 3), and has operated the operating unit 145 (FIG. 3) so as to select a desired content (of the content guide), the portable terminal 106 takes the content selected by the user as the content to be downloaded, and recognizes the content ID thereof from the content guide received in step S302.

Subsequently, the portable terminal 106 awaits until the user selects a controlled device to which the content to be downloaded is downloaded by operating the operating unit 145 (FIG. 3), and in step S304 transmits a download request for requesting the content to be downloaded selected by the user, the content ID of the content to be downloaded, and the controlled device ID of the controlled device selected by the user to the service server 104 through the base station 103 and network 100.

Now, in FIG. 10, we will say that the user selects two of the network devices 112 and 113 as controlled devices to which the content to be downloaded is downloaded, and in step S304 the device IDS of the network devices 112 and 113 thereof are transmitted as controlled device IDs.

The download request, content ID, control device ID, and controlled device ID transmitted by the portable terminal 106 are received at the service server 104 in step S311.

In step S312, in response to the download request from the portable terminal 106, the service server 104 transmits an access information request for requesting necessary access information for accessing the controlled device identified with the controlled device ID from the portable terminal 106 along with the control device ID and controlled device ID from the portable terminal 106 to the direct access administration server 105 through the network 100.

The access information request, control device ID, and controlled device ID transmitted by the service server 104 are received at the direct access administration server 105 in step S321.

In response to the access information request from the service server 104, the direct access administration server 105 accesses the controlled device identified with the controlled device ID from the service server 104 to request the access information.

Now, in FIG. 10, the controlled device IDs from the service server 104, i.e., the controlled device IDs from the portable terminal 106 is, as described above, the device IDs of the network devices 112 and 113, and the network devices 112 and 113 are registered on the device table of the direct access administration server 105 in correlation with the portable terminal 106. Accordingly, there is provided a permanent session between the direct access administration server 105 and each of the network devices 112 and 113, so the direct access administration server 105 can access each of the network devices 112 and 113 identified with the controlled device ID from the service server 104 through the network 100 and router 111, according to the permanent session.

Therefore, in step S322, the direct access administration server 105 transmits an access information request to the network devices 112 and 113 through the network 100 and router 111.

The access information request transmitted by the direct access administration server 105 is received at the network device 112 in step S353, and also received at the network device 113 in step S373.

In step S354, in response to the access information request from the direct access administration server 105, in the same way as with the case shown in FIG. 8, the network device 112 performs NAT transversal to acquire the access information necessary for accessing the network device 112.

Subsequently, in step S355, the network device 112 transmits the access information to the direct access administration server 105 through the router 111 and network 100.

Similarly, in step S374, in response to the access information request from the direct access administration server 105, the network device 113 also performs NAT transversal to acquire the access information necessary for accessing the network device 112.

Subsequently, in step S375, the network device 113 transmits the access information to the direct access administration server 105 through the router 111 and network 100.

The access information transmitted by the network device 112 is received at the direct access administration server 105 in step S323, and also, the access information transmitted by the network device 113 is received at the direct access administration server 105 in step S324.

In step S325, the direct access administration server 105 transmits the access information from the network devices 112 and 113 to the service server 104 through the network 100.

The access information transmitted by the direct access administration server 105 is received at the service server 104 in step S313.

The service server 104 performs router 111 transversal (NAT transversal) through the network 100 based on the access information from the direct access administration server 105 to access (direct access) the network devices 112 and 113, and transmits a download request for requesting downloading of the content identified with the content ID received in step S311, and the content ID thereof to the network devices 112 and 113 through the network 100 and router 111.

The download request and content ID transmitted by the service server 104 are received at the network device 112 in step S356, and also received at the network device 113 in step S376.

Subsequently, in response to the download request from the service server 104, the network devices 112 and 113 take the content identified with the content ID from the service server 104 as the content to be downloaded, and perform downloading of the content thereof.

Specifically, in step S357, in the same way as with step S104 in FIG. 6, the network device 112 determines whether or not the content to be downloaded is downloadable, e.g., determines this with reference to the downloadable date of the content guide received in step S352.

In a case wherein determination is made in step S357 that the content to be downloaded is not downloadable, the processing returns to step S357, where the network device 112 awaits until the date represented with the downloadable date correlated with the content ID of the content to be downloaded comes.

Also, in a case wherein determination is made in step S357 that the content to be downloaded is downloadable, the processing proceeds to step S358, where the network device 112 transmits a content request for requesting downloading of the content represented with the download URL correlated with the content ID of the content to be downloaded, the content ID of the content to be downloaded, and the device type representing the type of the network device 112 to the content distribution server 102 through the router 111 and network 100 based on the download URL correlated with the content ID of the content to be downloaded of the content guide. Let us say that the device type representing the type of the network device 112 is, for example, stored in the network device 112 beforehand.

On the other hand, in step S377, in the same way as with the network device 112, the network device 113 also determines whether or not the content to be download is downloadable, e.g., determines this with reference to the downloadable date of the content guide received in step S372.

In a case wherein determination is made in step S377 that the content to be downloaded is not downloadable, the processing returns to step S377, where the network device 113 awaits until the date represented with the downloadable date correlated with the content ID of the content to be downloaded comes.

Also, in a case wherein determination is made in step S377 that the content to be downloaded is downloadable, the processing proceeds to step S378, where the network device 113 transmits a content request for requesting downloading of the content represented with the download URL correlated with the content ID of the content to be downloaded, the content ID of the content to be downloaded, and the device type representing the type of the network device 113 to the content distribution server 102 through the router 111 and network 100 based on the download URL correlated with the content ID of the content to be downloaded of the content guide. Let us say that the device type representing the type of the network device 113 is, for example, stored in the network device 113 beforehand.

The content request, content ID, and device type transmitted by the network device 112 are received at the content distribution server 102 in step S341, and also the content request, content ID, and device type transmitted by the network device 113 are received at the content distribution server 102 in step S342.

In step S343, in response to the content request from the network device 112, the content distribution server 102 selects a content for network device by the device type from the network device 112, of the content identified with the content ID from the network device 112.

Further, in step S343, in response to the content request from the network device 113, the content distribution server 102 selects a content for network device by the device type from the network device 113, of the content identified with the content ID from the network device 112.

Subsequently, in step S344, the content distribution server 102 transmits the content for the network device 112 selected in step S343 to the network device 112, and transmits the content for the network device 113 selected in step S343 to the network device 113, through the network 100 and router 111.

In step S359, the network device 112 receives the content from the content distribution server 102, thereby performing downloading of the content to be downloaded. Subsequently, in step S360, the network device 112 records the content to be downloaded in the HD 174 (FIG. 4).

Similarly, in step S379, the network device 113 receives the content from the content distribution server 102, thereby performing downloading of the content to be downloaded. Subsequently, in step S380, the network device 113 records the content to be downloaded.

Incidentally, in the above-mentioned case, as shown in FIG. 5, an arrangement has been made wherein the content guide made up of content IDs, content titles, downloadable dates, and download URLs is provided at the content guide server 101, but of these content IDs, content titles, downloadable dates, and download URLs, downloadable dates and download URLs are information necessary only for the content to be downloaded, i.e., information necessary for downloading a content (hereafter, referred to as download control information as appropriate), and accordingly, this download control information is not needed unless a content is loaded.

Therefore, for example, the content guide including content IDs and content titles, and the download control information such as downloadable dates, download URLs, and so forth can be provided separately.

Figure 11:
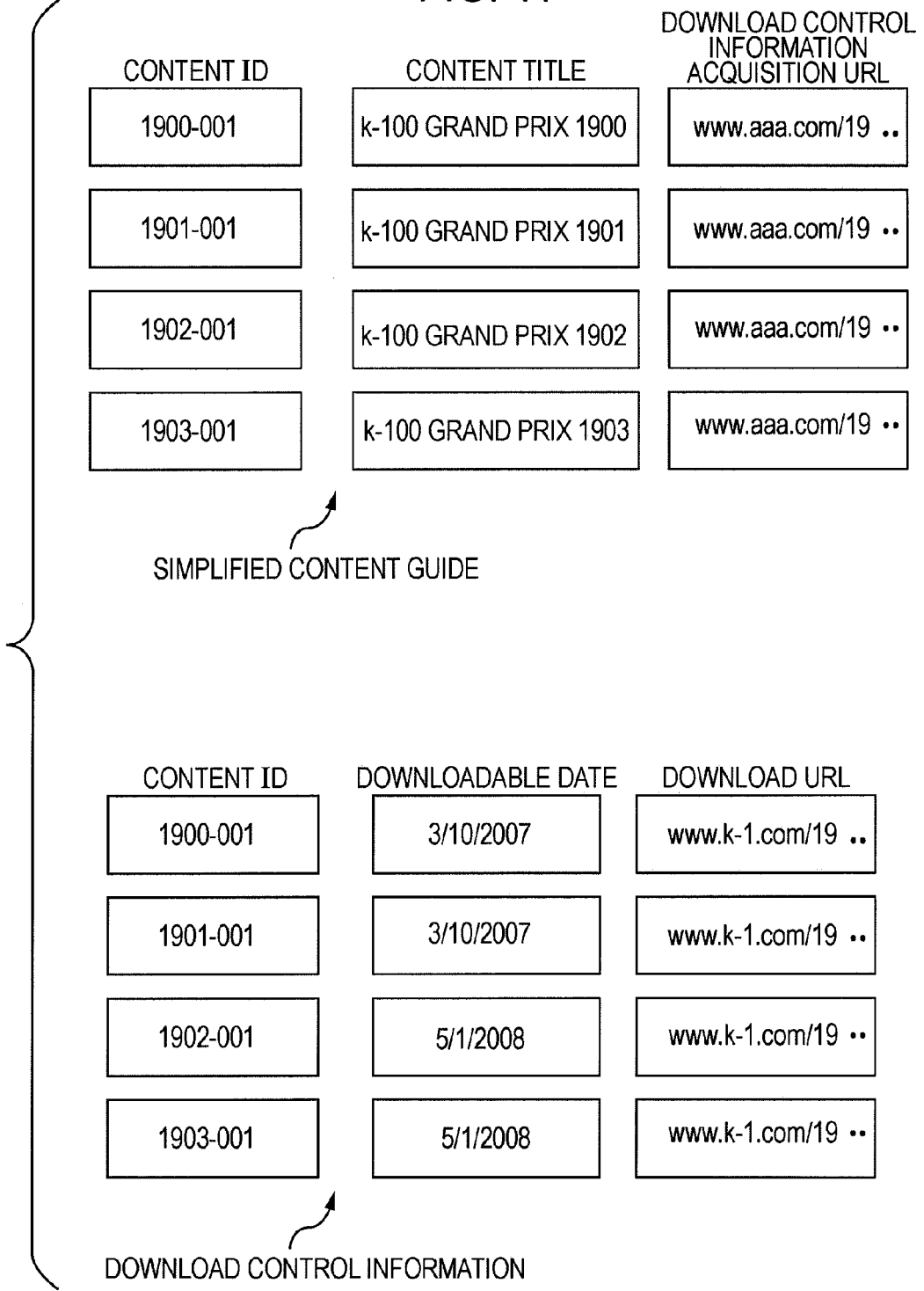
FIG. 11 is a diagram illustrating a simplified content guide and download control information.

FIG. 11 illustrates the content guide and download control information provided by the content guide server 101. In FIG. 11, the content guide (upper half in FIG. 11) is made up of content IDs, the content titles of the contents identified with the content IDs thereof, and download control information acquisition URLs. Also, the download control information (lower half in FIG. 11) is made up of content IDs, the downloadable dates regarding the contents identified with the content IDs thereof, and download URLs.

In FIG. 11, the download control information acquisition URLs making up the content guide represent positions on the network 100 where the download control information necessary for downloading contents exists. The content guide made up of content IDs, content titles, and download control information acquisition URLs in FIG. 11 (hereafter, referred to as a simplified content guide) has less data amount than the content guide shown in FIG. 5, and accordingly, employing the simplified content guide enables time necessary for download to be reduced, and enables traffic on the network 100 to be reduced.

Next, description will be made with reference to FIG. 12 regarding the direct operation download processing in the case of the content guide server 101 providing the simplified content guide and download control information in FIG. 11. With the direct operation download, for example, the network device 112 is operated directly by the user, and in response to the operations thereof, the network device 112 performs downloading of a content from the content distribution server 102.

Specifically, when the network device 112 is operated by the user so as to obtain the content guide, or periodically, or on an irregular basis, in step S401 the network device 112 accesses the content guide server 101 to transmit a content guide request for requesting the content guide, through the router 111 and network 100.

In step S411, the content guide server 101 receives the content guide request from the network device 112. Subsequently, in step S412, in response to the content guide request from the network device 112, the content guide server 101 transmits the simplified content guide (upper half in FIG. 11) made up of content IDs, content titles, and download control information acquisition URLs to the network device 112 through the network 100 and router 111.

In step S402, the network device 112 receives the simplified content guide from the content guide server 101, and displays this on the output unit 175 (FIG. 4).

Subsequently, in step S403, the network device 112 determines whether or not the content to be downloaded has been selected by the user.

In a case wherein determination is made in step S403 that the content to be downloaded has not been selected, the processing returns to step S403, and hereafter, the same processing is repeated.

Also, in a case wherein determination is made in step S403 that the content to be downloaded has been selected, i.e., in a case wherein the user views the content guide displayed on the output unit 175 (FIG. 4) and operates the input unit 176 (FIG. 4) so as to select a desired content (of the content guide), the network device 112 takes the content selected by the user as the content to be downloaded, and the processing proceeds to step S404.

In step S404, the network device 112 transmits a download (DL) control information request for requesting the download control information (lower half in FIG. 11) regarding the content to be downloaded, and the content ID of the content thereof to the content guide server 101 through the router 111 and network 100 based on the download control information acquisition URLs of the simplified content guide (upper half in FIG. 11).

The download control information request and content ID transmitted by the network device 112 are received at the content guide server 101 in step S413.

In step S414, in response to the download control information request from the network device 112, the content guide server 101 transmits the download control information made up of the content ID, the downloadable date of the content identified with the content ID thereof, and download URL from the network device 112 to the network device 112 through the network 100 and router 111.

The download control information transmitted by the content guide server 101 is received at the network device 112 in step S405.

In step S406, the network device 112 determines whether or not the content to be downloaded is downloadable, for example, with reference to the downloadable date of the download control information received in step S405.

In a case wherein determination is made in step S406 that the content to be downloaded is not downloadable, the processing returns to step S406, where the network device 112 awaits until the date represented with the downloadable date of the download control information received in step S405 comes.

Also, in a case wherein determination is made in step S406 that the content to be downloaded is downloadable, the processing proceeds to step S407, where the network device 112 transmits a content request for requesting downloading of the content represented with the download URL of the download control information received in step S405, the content ID of the content to be downloaded, and device type to the content distribution server 102 through the router 111 and network 100 based on the download URL of the download control information received in step S405.

The content request, content ID, and device type transmitted by the network device 112 is received at the content distribution server 102 in step S421. Subsequently, in step S422, in response to the content request from the network device 112, the content distribution server 102 selects a content for network device having the type represented with the device type of the content identified with the content ID also from the network device 112.

Subsequently, in step S423, the content distribution server 102 transmits the content selected in step S422 to the network device 112 through the network 100 and router 111.

In step S408, the network device 112 receives the content from the content distribution server 102, thereby performing downloading of the content to be downloaded. Subsequently, in step S409, the network device 112 records the content to be downloaded in the HD 174.

Figure 13:
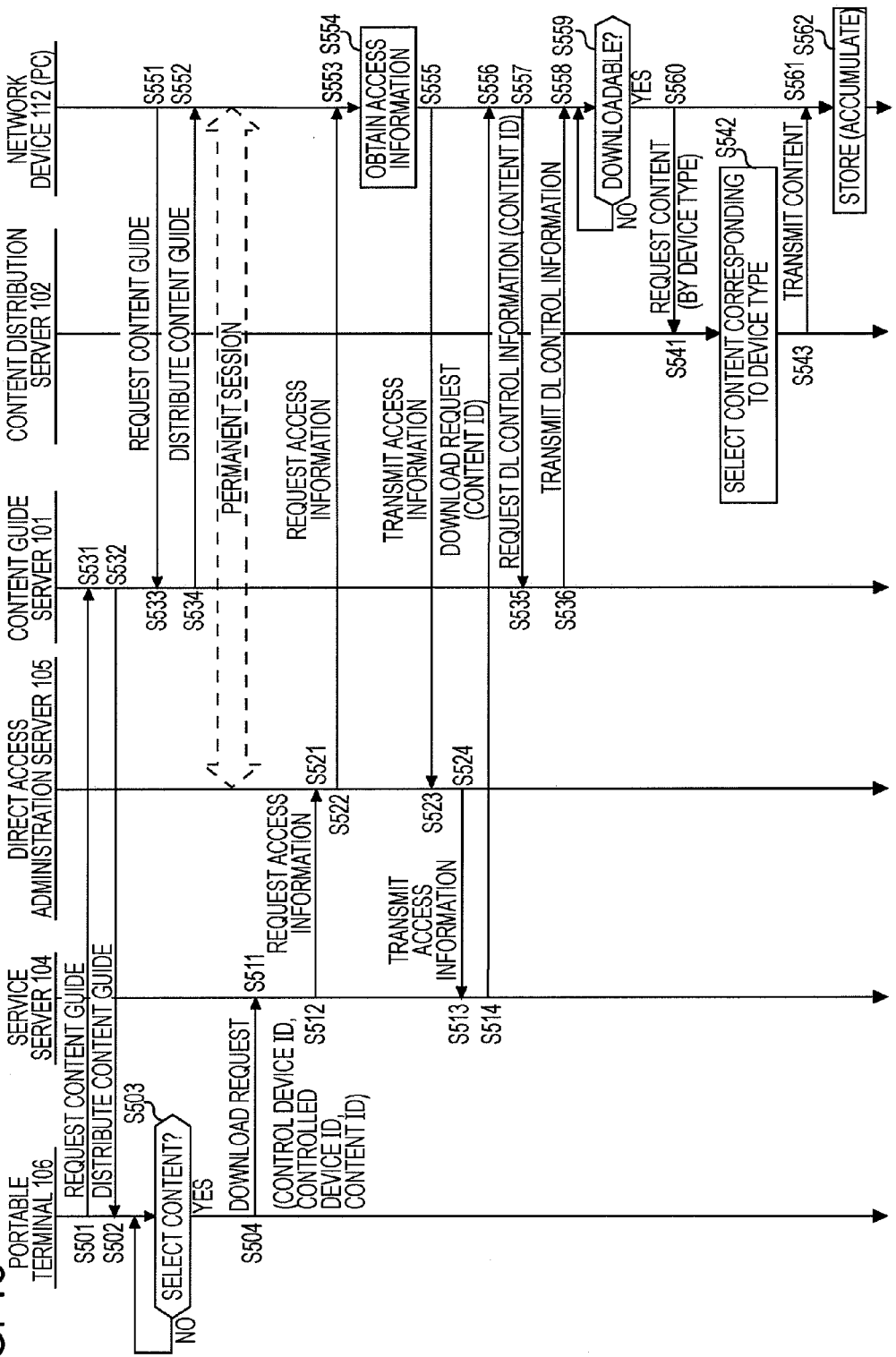
FIG. 13 is a diagram for describing the remote download processing in a case wherein the content guide server 101 provides a simplified content guide and download control information.

Next, description will be made with reference to FIG. 13 regarding the remote download processing in a case wherein the content guide server 101 provides the simplified content guide and download control information shown in FIG. 11. When the portable terminal 106 is operated by the user so as to obtain the content guide, or periodically, or on an irregular basis, in step S501 the portable terminal 106 accesses the content guide server 101 to transmit a content guide request through the base station 103 and network 100.

In step S531, the content guide server 101 receives the content guide request from the portable terminal 106. Subsequently, in step S532, in response to the content guide request from the portable terminal 106, the content guide server 101 transmits the simplified content guide (upper half in FIG. 11) to the portable terminal 106 through the network 100 and base station 103.

In step S502, the portable terminal 106 receives the simplified content guide from the content guide server 101, and displays this on the display 149 (FIG. 3).

On the other hand, the network device 112 also acquires the simplified content guide from the content guide server 101.

Specifically, in step S551, the network device 112 accesses the content guide server 101 periodically or on an irregular basis to transmit a content guide request through the router 111 and network 100.

In step S533, the content guide server 101 receives the content guide request from the network device 112. Subsequently, in step S534, in response to the content guide request from the network device 112, the content guide server 101 transmits the simplified content guide to the network device 112 through the network 100 and router 111.

In step S552, the network device 112 receives the simplified content guide from the content guide server 101, and stores this.

On the other hand, in step S503, the portable terminal 106 determines whether or not the content to be downloaded has been selected by the user.

In a case wherein determination is made in step S503 that the content to be downloaded has not been selected, the processing returns to step S503, and hereafter, the same processing is repeated.

Also, in a case wherein determination is made in step S503 that the content to be downloaded has been selected, i.e., in a case wherein the user has viewed the content guide displayed on the display 149 (FIG. 3), and has operated the operating unit 145 (FIG. 3) so as to select a desired content (of the content guide), the portable terminal 106 takes the content selected by the user as the content to be downloaded, and recognizes the content ID thereof from the content guide received in step S502.

Subsequently, as described with reference to FIG. 8, the portable terminal 106 awaits until the user selects a controlled device to which the content to be downloaded is downloaded by operating the operating unit 145 (FIG. 3), and in step S504, transmits a download request for requesting the content to be downloaded selected by the user, the content ID of the content to be downloaded, the device ID (controlled device ID) of the portable terminal 106, and the controlled device ID of the controlled device selected by the user, to the service server 104 through the base station 103 and network 100.

The download request, content ID, control device ID, and controlled device ID transmitted by the portable terminal 106 are received at the service server 104 in step S511.

In step S512, in response to the download request from the portable terminal 106, the service server 104 transmits an access information request for requesting access information necessary for accessing the controlled device identified with the controlled device ID from the portable terminal 106 along with the control device ID and controlled device ID from the portable terminal 106 to the direct access administration server 105 through the network 100.

The access information request, control device ID, and controlled device ID transmitted by the service server 104 are received at the direct access administration server 105 in step S521.

In response to the access information request from the service server 104, the direct access administration server 105 accesses the controlled device identified with the controlled device ID from the service server 104 to request the access information.

Specifically, in the same way as with the case shown in FIG. 8, in step S522, the direct access administration server 105 transmits an access information request to the network device 112 identified with the controlled device ID from the service server 104 through the network 100 and router 111.

The access information request transmitted by the direct access administration server 105 is received at the network device 112 in step S553.

In step S554, in response to the access information request from the direct access administration server 105, the network device 112 acquires the access information, as described with reference to FIG. 8.

Subsequently, in step S555, the network device 112 transmits the access information to the direct access administration server 105 through the router 111 and network 100.

The access information transmitted by the network device 112 is received at the direct access administration server 105 in step S523. In step S524, the direct access administration server 105 transmits the access information from the network device 112 to the service server 104 through the network 100.

The access information transmitted by the direct access administration server 105 is received at the service server 104 in step S513.

In step S514, the service server 104 performs router 111 transversal (NAT transversal) through the network 100 based on the access information from the direct access administration server 105 to transmit a download request for requesting downloading of the content identified with the content ID received in step S511, and the content ID thereof to the network device 112 through the network 100 and router 111.

The download request and content ID transmitted by the service server 104 is received at the network device 112 in step S556.

Subsequently, in response to the download request from the service server 104, the network device 112 takes the content identified with the content ID from the service server 104 in the same way as the content to be downloaded, and performs downloading of the content thereof.

Figure 12:
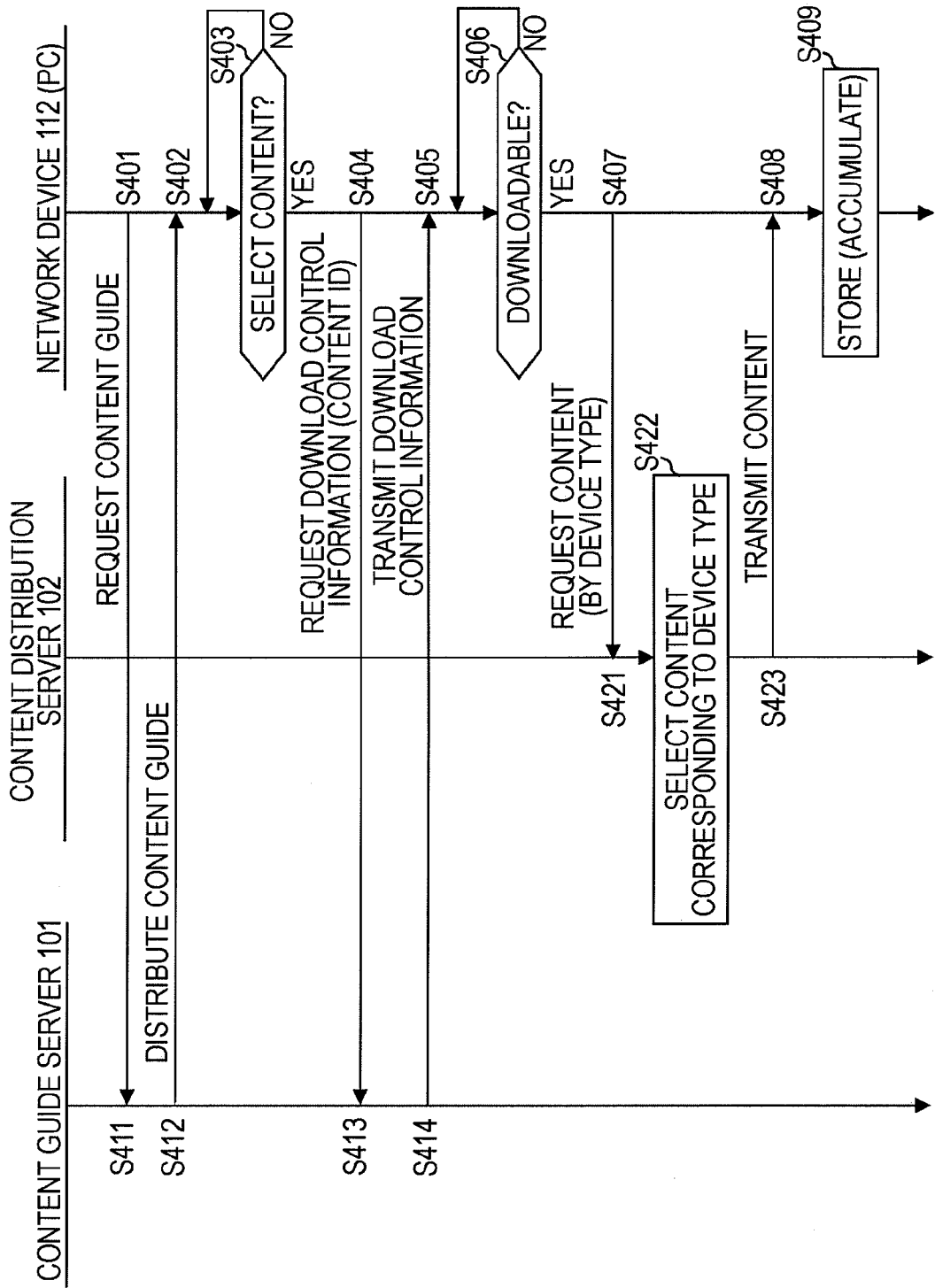
FIG. 12 is a diagram for describing the direct operation download processing in a case wherein a content guide server 101 provides a simplified content guide and download control information.

Specifically, in steps S535 and S536 the same processing in each of steps S413 and S414 in FIG. 12 is performed at the content guide server 101, and in steps S541 through S543 the same processing in each of steps S421 through S423 in FIG. 12 is performed at the content distribution server 102.

Subsequently, in steps S557 through S562 the same processing in each of steps S404 through S409 in FIG. 12 is performed at the network device 112.

Figure 14:
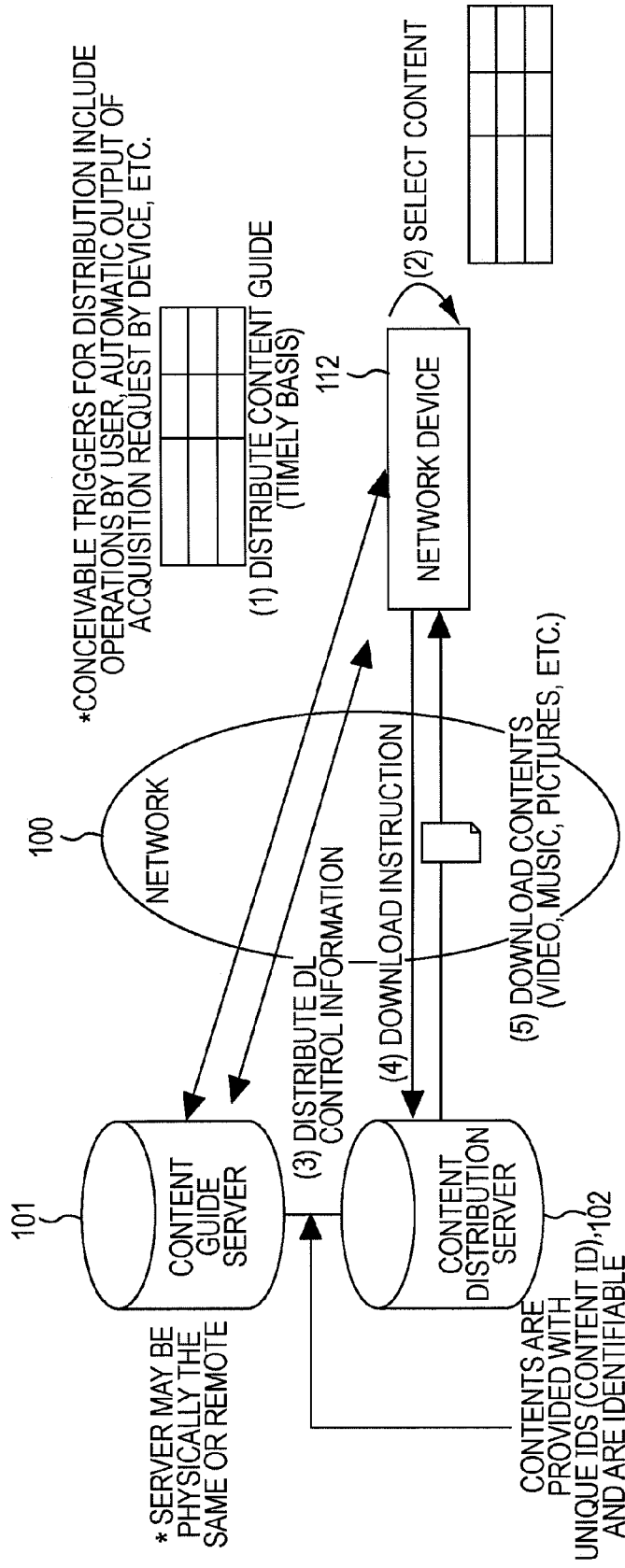
FIG. 14 is a diagram for describing another direct operation download processing.

Next, description will be made regarding other processing of the direct operation download with reference to FIG. 14. The network device 112 receives the content guide (downloadable content list, detailed information) from the content guide server on a timely basis, and displays this [(1)].

When the user selects a content from the content guide of the network device 112, the network device 112 acquires the download control information from the content guide server 101 based on the download control information acquisition URL corresponding to the content thereof, and stores this [(2) (3)].

The network device 112 instructs the content distribution server 102 to download the relevant content based on the download conditions described in the download control information [(4)].

The network device 112 receives the relevant content from the content distribution server 102, and stores this [(5)].

FIG. 15 and FIG. 16 illustrate the content guide and download control information employed at the above-mentioned direct operation download processing in FIG. 14 and later-described remote download processing in FIG. 17.

FIG. 15 illustrates the content guide. In FIG. 15, the content guide is made up of content titles, and download acquisition URLS. FIG. 16 illustrates the download control information. In FIG. 16, the download control information is made up of content IDs, downloadable dates, and download URLS. Note that, in FIG. 16, the download control information made up of the content ID, downloadable date, and download URL regarding each of the contents is correlated with the download control information acquisition URL regarding the content thereof.

Next, description will be made regarding other processing of the remote download with reference to FIG. 17. The portable terminal 106 and network device 112 access the content guide server 101 as appropriate to transmit a content guide request, and receive the content guide shown in FIG. 15 which the content guide server 101 transmits in response to the content guide request thereof.

When a content to be downloaded is selected by the user, the portable terminal 106 takes the content selected by the user as the content to be downloaded, and transmits the download control information acquisition URL correlated with the content title of the content to be downloaded of the content guide in FIG. 15, as a controlled device to which the content to be downloaded is downloaded, e.g., the controlled device ID of the network device 112, and the control device ID of the portable terminal 106, and a download request, to the service server 104.

The service server 104 receives the download control information acquisition URL, the controlled device ID of the network device 112, the control device ID of the portable terminal 106, and the download request, from the portable terminal 106, and transmits an access information request for requesting access information necessary for accessing the controlled device identified with the controlled device ID to the direct access administration server 105.

In response to the access information request from the service server 104, the direct access administration server 105 accesses the network device 112 serving as the controlled device identified with the controlled ID from the service server 104, acquires the access information as described with reference to FIG. 8, and transmits this to the service server 104.

The service server 104 accesses the network device 112 based on the access information from the direct access administration server 105 to transmit the download control information acquisition URL and download request from the portable terminal 106 to the network device 112.

In response to the download request from the service server 104, the network device 112 transmits a download control information request for requesting the download control information (FIG. 16) regarding the content to be downloaded to the content guide server 101 based on the download control information acquisition URL from the service server 104.

In response to the download control information request from the network device 112, the content guide server 101 transmits the download control information (FIG. 16) correlated with the download control information acquisition URL from the network device 112 to the network device 112.

The network device 112 receives the download control information from the content guide server 101, and performs downloading of the content from the content distribution server 102 based on the download control information thereof in the same way as with steps S406 through S409 in FIG. 12.

As described above, with the download system shown in FIG. 1, in a case wherein the content to be downloaded has been selected by the user, the portable terminal 106 transmits a download request for requesting downloading of the content along with the content ID serving as data identification information for identifying the content to be downloaded, or download control information acquisition URL, and the controlled device ID serving as device identification information for identifying the network device 112 or the like which is caused to perform downloading of the content, to the service server 104 through the network 100, and in response to the download request from the portable terminal 106, the service server 104 transmits the download request along with the content ID to the network device 112 identified with the controlled device ID, and in response to the download request from the service server 104, the network device 112 downloads the content identified with the content ID from the content distribution server 102 through the network 100.

Accordingly, for example, when finding a favorite content (desired content) by the portable terminal 106 in possession away from home, the user can download the desired content to the network device 112 or the like at home by operating the portable terminal 106 in possession away from home, without operating the network device 112 or the like after returning home.

As a result thereof, the user performs downloading of the desired content to the network device 112 or the like at home while away from home, whereby the user can perform viewing and listening of the desired content immediately after returning home.

Also, in a case wherein the user operates the portable terminal 106 to select multiple network devices which perform downloading of a desired content, such as the network devices 112 and 113 at home, the portable terminal 106 transmits the device ID (controlled device ID) of each of, for example, the network devices 112 and 113 serving as the multiple network devices thereof along with a download request to the service server 104, and the service server 104 transmits the download request to each of the network devices 112 and 113 identified with the controlled device ID, whereby the user can download a desired content to each of the multiple network devices 112 and 113 only by operating the operating unit 106 without operating each of the network devices 112 and 113.

Further, in a case wherein the content distribution server 102 distributes a content for each of the multiple types of network device, for example, the network device 112 transmits the device type representing the type of the network device 112 thereof to the content distribution server 102, and downloads a content for the network device of the type represented with the device type thereof, for example, whereby a content for a codec suitable for the network device 112 can be downloaded.

Note that, with the present embodiment, an arrangement has been made wherein the user operates the portable terminal 106 in possession away from home, thereby downloading a content to the network device 112 of the user's house, but the terminal operated by the user to cause the network device 112 of the user's house to download a content is not restricted to the portable terminal 106, so for example, a terminal having a communication function for performing communication through the network 100, i.e., for example, a desktop-type PC or the like installed away from home may be employed.

Also, with the present embodiment, an arrangement has been made wherein the service server 104 acquires access information for accessing the network device 112 from the direct access administration server 105, accesses the network device 112 based on the access information thereof, thereby causing the network device 112 to perform downloading of a content, but in addition to this, for example, an arrangement may be made wherein the service server 104 transmits an e-mail for requesting downloading to the network device 112, the network device 112 receives an e-mail periodically or on an irregular basis, and in the case of receiving an e-mail for requesting downloading, performs downloading.

Now, with the present Specification, there is no need to process processing steps for describing a program causing a computer (processor including CPU) to perform various types of processing in a time-oriented manner in the order described as a flowchart, and processing executed in parallel or individually (e.g., parallel processing or object-oriented processing) is included therein.

Also, the program may be processed by a single computer, or may be processed by multiple computers in a distributed manner. Further, processing performed by a computer executing the program may be performed by dedicated hardware.

Note that the embodiments of the present invention are not restricted to the above-mentioned embodiment, and various modifications can be performed without departing from the essence of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, including a processor and a memory unit, comprising:
    first and second information processing devices, coupled to the memory unit, configured to perform communication through a network; and
    a third information processing device for downloading data through said network from a distribution server configured to distribute data, the third information processing device being connected, through a local network, to a router which is connected to the distribution server through said network, and functioning as a client for receiving provision of a download control service and downloading a content of a predetermined codec suitable for a type of the third information processing device;
    wherein said first information processing device includes first transmission means configured to, in the case of data to be downloaded being selected, transmit a download request for requesting downloading of data to the second information processing device through said network along with data identification information for identifying the data to be downloaded, and device identification information for identifying the third information processing device for performing downloading of data;

wherein said second information processing device, which provides a download control service for controlling the third information processing device to perform downloading of data from the distribution server to the third information processing device through the network, includes second transmission means configured to transmit a download request for requesting downloading of data to the third information processing device identified with said data identification information and said device identification information in response to the download request from said first information processing device; and wherein said third information processing device includes download means configured to download data identified with said data identification information from said distribution server through said network in response to the download request from said second information processing device, wherein the first, second and third information processing devices are located at different locations, and the second information processing device accesses and controls the third information processing device through the network, wherein a user, located at a first location where the third information processing device is not located, downloads a desired content to the third information processing device, which is located at a second location, by operating the first information processing device, which is located at the first location, without operating the third information processing device, and the user is able to playback the desired content on the third information processing device immediately after arriving at the second location where the third information processing device is located.

2. An information processing device configured to perform communication through a network, including a processor and a memory unit, comprising:

transmission means configured to, in the case of data to be downloaded being selected, transmit a download request for requesting downloading of data through said network to a service server along with data identification information for identifying the data to be downloaded, and device identification information for identifying a network device for performing downloading of data, wherein the service server provides a download control service for controlling the network device to perform downloading of data from a distribution server to the network device through the network, the network device being connected, through a local network, to a router which is connected to the distribution server through said network, and functioning as a client for receiving provision of a download control service and downloading a content of a predetermined codec suitable for a type of the network device, wherein the service server and the network device are located at different locations, and the service server accesses and controls the network device through the network, wherein a user, located at a first location where the network device is not located, downloads a desired content to the network device, which is located at a second location, by operating a terminal, which is located at the first location, without operating the network device, and the user is able to playback the desired content on the network device immediately after arriving at the second location where the network device is located.

3. The information processing device according to claim 2, wherein said transmission means transmit device identification information for identifying a singular or plurality of network devices.

4. An information processing method for an information processing device configured to perform communication through a network, comprising a step of:

transmitting, in the case of data to be downloaded being selected, a download request for requesting downloading of data through said network to a service server configured to provide a service along with data identification information for identifying the data to be downloaded, and device identification information for identifying a network device for performing downloading of data, wherein the service server provides a download control service for controlling the network device to perform downloading of data from a distribution server to the network device through the network, the network device being connected, through a local network, to a router which is connected to the distribution server through said network, and functioning as a client for receiving provision of a download control service and downloading a content of a predetermined codec suitable for a type of the network device, wherein the service server and the network device are located at different locations, and the service server accesses and controls the network device through the network, wherein a user, located at a first location where the network device is not located, downloads a desired content to the network device, which is located at a second location, by operating a terminal, which is located at the first location, without operating the network device, and the user is able to playback the desired content on the network device immediately after arriving at the second location where the network device is located.

5. A non-transitory computer-readable medium storing a computer program that when executed on a computer causes communication through a network, the program comprising the steps of:

wherein said program causes the computer to function as transmission means configured to transmit, in the case of data to be downloaded being selected, a download request for requesting downloading of data through said network to a service server configured to provide a service along with data identification information for identifying the data to be downloaded, and device identification information for identifying a network device for performing downloading of data, and wherein the service server provides a download control service for controlling the network device to perform downloading of data from a distribution server to the network device through the network, the network device being connected, through a local network, to a router which is connected to the distribution server through said network, and functioning as a client for receiving provision of a download control service and downloading a content of a predetermined codec suitable for a type of the network device, wherein the service server and the network device are located at different locations, and the service server accesses and controls the network device through the network, wherein a user, located at a first location where the network device is not located, downloads a desired content to the network device, which is located at a second location, by operating a terminal, which is located at the first location, without operating the network device, and the user is able to playback the desired content on the network device immediately after arriving at the second location where the network device is located.

* * * * *